(12) United States Patent
Talton et al.

(10) Patent No.: US 11,695,721 B2
(45) Date of Patent: Jul. 4, 2023

(54) METHOD, APPARATUS, AND COMPUTER PROGRAM PRODUCT FOR CATEGORIZING MULTIPLE GROUP-BASED COMMUNICATION MESSAGES

(71) Applicant: Slack Technologies, Inc., San Francisco, CA (US)

(72) Inventors: Jerry Talton, New York, NY (US); Andrew S. Morrison, New York, NY (US); Japinder Singh, New York, NY (US); Jon Katzur, San Francisco, CA (US); John Gallagher, New York, NY (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/463,371

(22) Filed: Aug. 31, 2021

(65) Prior Publication Data

US 2021/0392100 A1 Dec. 16, 2021

Related U.S. Application Data

(63) Continuation of application No. 16/523,647, filed on Jul. 26, 2019, now Pat. No. 11,115,360.
(Continued)

(51) Int. Cl.
*H04L 51/216* (2022.01)
*H04L 12/18* (2006.01)
*H04L 51/046* (2022.01)

(52) U.S. Cl.
CPC .......... *H04L 51/216* (2022.05); *H04L 12/185* (2013.01); *H04L 51/046* (2013.01)

(58) Field of Classification Search
CPC .... H04L 51/046; H04L 51/216; H04L 12/185
(Continued)

(56) References Cited

U.S. PATENT DOCUMENTS 8,185,448 B1 5/2012 Myslinski
10,021,059 B1 7/2018 Rao
(Continued)

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.
(Continued)

*Primary Examiner* — Wing F Chan
*Assistant Examiner* — Leon Y Tseng
(74) *Attorney, Agent, or Firm* — Lee & Hayes, P.C.

(57) ABSTRACT

An apparatus, method and computer program product may be provided for updating a graph-based knowledge representation data structure using one or more conversation segments. Updating a graph-based knowledge representation data structure may include receiving a conversation segment. The conversation segment may comprise one or more group-based communication messages and one or more sending user identifiers of the one or more group-based communication messages. Updating a graph-based knowledge representation data structure may further include identifying the one or more sending user identifiers of each group-based communication message of the conversation segment. Updating a graph-based knowledge representation data structure may further include determining one or more user identifiers of the sending user identifiers that satisfy conversation participation criteria. Updating a graph-based knowledge representation data structure may further include
(Continued)

updating a user to user link score associated with each user identifier pair of the one or more user identifiers according to conversation segment-based user to user link score update criteria.

20 Claims, 13 Drawing Sheets

Related U.S. Application Data

(60) Provisional application No. 62/712,121, filed on Jul. 30, 2018.

(58) Field of Classification Search
USPC .......................................................... 709/206
See application file for complete search history.

(56) References Cited

U.S. PATENT DOCUMENTS

| | | | |
|---|---|---|---|
| 2010/0049534 A1* | 2/2010 | Whitnah | G06Q 50/01 705/319 |
| 2011/0052155 A1 | 3/2011 | Desmarais et al. | |
| 2012/0005221 A1 | 1/2012 | Ickman et al. | |
| 2013/0226578 A1 | 8/2013 | Bolton et al. | |
| 2016/0285816 A1 | 9/2016 | Schmid et al. | |
| 2016/0294836 A1 | 10/2016 | Williams et al. | |
| 2017/0201850 A1 | 7/2017 | Raleigh et al. | |
| 2018/0114238 A1* | 4/2018 | Treiser | G06Q 30/0204 |
| 2018/0183619 A1 | 6/2018 | Jayaram et al. | |
| 2018/0287982 A1 | 10/2018 | Draeger et al. | |
| 2018/0295092 A1* | 10/2018 | Peiris | G06Q 50/01 |
| 2019/0007228 A1 | 1/2019 | Vuskovic et al. | |
| 2019/0208370 A1 | 7/2019 | Brunn | |
| 2019/0297035 A1 | 9/2019 | Fox et al. | |
| 2019/0386949 A1 | 12/2019 | Vennam et al. | |

OTHER PUBLICATIONS

Belkaroui, et al., "Conversation Analysis on Social Networking Sites" IEEE, 2014, pp. 172-178.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims to Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Hui, et al., "Text Mining for Chat Message Analysis", IEEE, 2008, pp. 411-416.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.
Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", Fujitsu Sci. Tech. J., 36, 2, (Dec. 2000) pp. 154-161.
Office Action for U.S. Appl. No. 16/523,647, dated Feb. 9, 2021, Talton, "Method, Apparatus, And Computer Program Product for Categorizing Multiple Group-Based Communication Messages", 22 pages.
Office Action for U.S. Appl. No. 16/523,647, dated Sep. 18, 2020, Talton, "Method, Apparatus, and Computer Program Product for Categorizing Multiple Group-Based Communication Messages", 20 Pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

METHOD, APPARATUS, AND COMPUTER PROGRAM PRODUCT FOR CATEGORIZING MULTIPLE GROUP-BASED COMMUNICATION MESSAGES

The present application claims priority to U.S. patent application Ser. No. 16/523,647, filed Jul. 26, 2019, and U.S. Provisional Application Ser. No. 62/712,121, filed Jul. 30, 2018, both titled "METHOD, APPARATUS, AND COMPUTER PROGRAM PRODUCT FOR CATEGORIZING MULTIPLE GROUP-BASED COMMUNICATION MESSAGES," the contents of which are incorporated herein by reference in their entirety.

BACKGROUND

Various messaging systems may support communication and collaboration among users across an enterprise. Applicant has identified a number of deficiencies and problems associated with collaborative communication environments. Through applied effort, ingenuity, and innovation, many of these identified problems have been solved by developing solutions that are included in embodiments of the present disclosure, many examples of which are described in detail herein.

BRIEF SUMMARY

In general, embodiments of the present disclosure provided herein include methods, apparatus, and computer program products for categorizing multiple group-based communication messages in a workspace.

In some embodiments of the present disclosure, an apparatus may be provided for categorizing multiple group-based communication messages in a workspace, the apparatus comprising at least one processor and at least one non-transitory memory including program code, the at least one non-transitory memory and the program code configured to, with the processor, cause the apparatus to at least receive a channel message corpus representing multiple communication messages. Each of the multiple communication messages of the channel message corpus share a group-based communication channel identifier. The memory including the program code is further configured to, with the processor, cause the apparatus to determine one or more conversation primitive identifiers for each of the multiple communication messages by using a conversation primitive identification engine coupled with the processor. The memory including the program code is further configured to, with the processor, cause the apparatus to group each of the multiple communication messages into one or more conversation segments based on the one or more conversation primitive identifiers.

In some embodiments, the at least one non-transitory memory and the program code are further configured to, with the processor, cause the apparatus to determine the conversation primitive identifier for each of the multiple communication messages by identifying a timestamp data associated with each of the multiple communication messages; calculating a set of message send time proximities between the multiple communication messages using the timestamp data associated with each of the multiple communication messages; comparing the message send time proximities to a pre-determined message send time threshold; and in a circumstance where a selected set of the message send time proximities satisfy the pre-determined message send time threshold, issuing a common primitive identifier to each communication message that is associated with the selected set of message send time proximities.

In some embodiments, the memory including the program code is further configured to, with the processor, cause the apparatus to determine the conversation primitive identifier for each of the multiple communication messages by: generating an order list indicating a chronological order where each of the multiple communication messages was sent; calculating a set of message send order proximities between the multiple communication messages using the order list; comparing the set of message send order proximities to a pre-determined message send order threshold; and in a circumstance where a selected set of the message send order proximities satisfy the pre-determined message send order threshold, issuing a common primitive identifier to each communication message that is associated with the selected set of message order proximities.

In some embodiments, the memory including the program code is further configured to, with the processor, cause the apparatus to determine the conversation primitive identifier for each of the multiple communication messages by: identifying message sending user identifiers associated with each of the multiple communication messages; calculating a set of sending user identifier proximities between the multiple communication messages using the identified message sending users; comparing the set of sending user identifier proximities to a pre-determined sending user identifier threshold; and in a circumstance where a selected set of the sending user identifier proximities satisfy the pre-determined sending user identifier threshold, issuing a common primitive identifier to each communication message that is associated with the selected set of sending user identifier proximities.

In some embodiments, the memory including the program code is further configured to, with the processor, cause the apparatus to determine the conversation primitive identifier for each of the multiple communication messages by: calculating a set of message send time proximities between the multiple communication messages; calculating a set of message send order proximities between the multiple communication messages; calculating a set of sending user identifier proximities between the multiple communication message; calculating a set of overall message proximities using the set of message send time proximities, the set of message send order proximities, and the set of sending user identifier proximities; comparing the set of overall message proximities to a pre-determined overall message threshold; and in a circumstance where a selected set of the overall message proximities satisfy a pre-determined overall message threshold, issuing a common primitive identifier to each communication message that is associated with the selected set of overall message proximities.

In some embodiments, the memory including the program code is further configured to, with the processor, cause the apparatus to determine the conversation primitive identifiers for each of the multiple communication messages by: parsing each of the multiple communication messages into one or more communication message segments; identifying a set of topics associated with each of the multiple communication messages; and determining a set of conversation primitive identifiers for each of the multiple communication messages, wherein communication messages with the same topic are determined to have the same conversation primitive identifier.

In some embodiments, parsing each of the multiple communication messages into one or more communication message segments uses a message parsing machine learning model.

In some embodiments, the memory including the computer program code is further configured to, with the processor, cause the apparatus to: provide each of the multiple communication messages to a user message categorization interface; provide the set of topics associated with each of the multiple communication messages; receive a set of user-generated suggestions associated with the set of topics; and re-determine a set of conversation primitive identifiers for each of the multiple communication messages based on the user-generated suggestions.

In some embodiments, the user-generated suggestions includes one or more of: a topic, a correctness indication, or a topic redetermination indication.

In some embodiments, the user message categorization interface is associated with a set of user profiles defined to have access rights to each of the multiple communication messages.

In another example embodiment, a method may be provided for categorizing multiple group-based communication messages in a workspace into one or more conversation segments. The method includes receiving a channel message corpus representing multiple communication messages. Each of the multiple communication messages of the channel message corpus share a group-based communication channel identifier. The method further includes determining one or more conversation primitive identifiers for each of the multiple communication messages by using a conversation primitive identification engine. The method further includes grouping each of the multiple communication messages into one or more conversation segments based on the one or more conversation primitive identifiers.

In some embodiments, determining a conversation primitive identifier for each of the multiple communication messages includes: identifying a timestamp data associated with each of the multiple communication messages; calculating a set of message send time proximities between the multiple communication messages using the timestamp data associated with each of the multiple communication messages; comparing the message send time proximities to a pre-determined message send time threshold; and in a circumstance where a selected set of the message send time proximities satisfy the pre-determined message send time threshold, issuing a common primitive identifier to each communication message that is associated with the selected set of message send time proximities.

In some embodiments, determining a conversation primitive identifier for each of the multiple communication messages includes: generating an order list indicating a chronological order where each of the multiple communication messages was sent; calculating a set of message send order proximities between the multiple communication messages using the order list; comparing the set of message send order proximities to a pre-determined message send order threshold; and in a circumstance where a selected set of the message send order proximities satisfy the pre-determined message send order threshold, issuing a common primitive identifier to each communication message that is associated with the selected set of message order proximities.

In some embodiments, determining a conversation primitive identifier for each of the multiple communication messages includes: identifying message sending user identifiers associated with each of the multiple communication messages; calculating a set of sending user identifier proximities between the multiple communication messages using the identified message sending users; comparing the set of sending user identifier proximities to a pre-determined sending user identifier threshold; and in a circumstance where a selected set of the sending user identifier proximities satisfy the pre-determined sending user identifier threshold, issuing a common primitive identifier to each communication message that is associated with the selected set of sending user identifier proximities.

In some embodiments, determining a conversation primitive identifier for each of the multiple communication messages includes: calculating a set of message send time proximities between the multiple communication messages; calculating a set of message send order proximities between the multiple communication messages; calculating a set of sending user identifier proximities between the multiple communication message; calculating a set of overall message proximities using the set of message send time proximities, the set of message send order proximities, and the set of sending user identifier proximities; comparing the set of overall message proximities to a pre-determined overall message threshold; and in a circumstance where a selected set of the overall message proximities satisfy a pre-determined overall message threshold, issuing a common primitive identifier to each communication message that is associated with the selected set of overall message proximities.

In some embodiments, determining the conversation primitive identifiers for each of the multiple communication messages further includes: parsing each of the multiple communication messages into one or more communication message segments; identifying a set of topics associated with each of the multiple communication messages; and determining a set of conversation primitive identifiers for each of the multiple communication messages, wherein communication messages with the same topic are determined to have the same conversation primitive identifier.

In some embodiments, parsing each of the multiple communication messages into one or more communication message segments uses a message parsing machine learning model.

In some embodiments, the method further includes: providing each of the multiple communication messages to a user message categorization interface; providing the set of topics associated with each of the multiple communication messages; receiving a set of user-generated suggestions associated with the set of topics; and re-determining a set of conversation primitive identifiers for each of the multiple communication messages based on the user-generated suggestions.

In some embodiments, the user-generated suggestions includes one or more of: a topic, a correctness indication, or a topic redetermination indication.

In some embodiments, the user message categorization interface is associated with a set of user profiles defined to have access rights to each of the multiple communication messages.

In another example embodiment, a method may be provided for categorizing multiple group-based communication messages in a workspace into one or more conversation segments. The method includes accessing a group-based communication message corpus representing multiple communication messages. The method further includes parsing, by using a thread identification module, the group-based communication message corpus to generate one or more thread message corpuses. The method further includes receiving a conversation segmenting learning model. The conversation segmenting learning model was derived using the thread message corpuses. The method further includes receiving a project group-based communication message stream. The method further includes generating a conversation primitive identification output based on the conversation segmenting learning model applied to the project group-based communication message stream. The conversation primitive identification output is configured to provide a conversation categorization of the group-based communication message stream.

In another example embodiment, an apparatus may be provided for categorizing multiple group-based communication messages in a workspace, the apparatus comprising at least one processor and at least one non-transitory memory including program code, the at least one non-transitory memory and the program code configured to, with the processor, cause the apparatus to at least access a group-based communication message corpus representing multiple communication messages. The memory including the program code is further configured to, with the processor, cause the apparatus to parse, by using a thread identification module, the group-based communication message corpus to generate one or more thread message corpuses. The memory including the program code is further configured to, with the processor, cause the apparatus to receive a conversation segmenting learning model. The conversation segmenting learning model was derived using the thread message corpuses. The memory including the program code is further configured to, with the processor, cause the apparatus to receive a project group-based communication message stream. The memory including the program code is further configured to, with the processor, cause the apparatus to generate a conversation primitive identification output based on the conversation segmenting learning model applied to the project group-based communication message stream. The conversation primitive identification output is configured to provide a conversation categorization of the group-based communication message stream.

In another example an apparatus may be provided for updating user to user link score using one or more conversation segments, the apparatus comprising at least one processor and at least one non-transitory memory including program code, the at least one non-transitory memory and the program code configured to, with the processor, cause the apparatus to at least: receive a conversation segment. The conversation segment comprises one or more group-based communication messages and one or more sending user identifiers of the one or more group-based communication messages. The memory including the program code is further configured to, with the processor, cause the apparatus to identify the one or more sending user identifiers of each group-based communication message of the conversation segment. The memory including the program code is further configured to, with the processor, cause the apparatus to determine one or more user identifiers of the sending user identifiers that satisfy conversation participation criteria. The memory including the program code is further configured to, with the processor, cause the apparatus to update user to user link score associated with each user identifier pair of the one or more user identifiers according to conversation segment-based user to user link score update criteria.

In some embodiments, the conversation participation criteria comprise one or more thresholds of percentage of group-based communication messages per conversation segment. In some embodiments, determining the one or more user identifiers of the sending user identifiers that satisfy the conversation participation criteria comprises: for each user identifier: determine a number of group-based communication messages associated with the user identifier in the conversation segment; determine a total number of group-based communication messages in the conversation segment; calculate the percentage of group-based communication messages per conversation segment for the user identifier by dividing the number of group-based communication messages associated with the user identifier in the conversation segment by the total number of group-based communication messages in the conversation segment; and determine that the percentage of group-based communication messages per conversation segment for the user identifier is higher than a lowest threshold of the one or more thresholds of percentage.

In some embodiments, updating the user to user link score comprises updating one or more user work graphs associated with each user identifier of each of the user identifier pairs. In some embodiments, updating the user to user link score comprises incrementing the user to user link score based on a pre-defined amount defined in the user link score update criteria. In some embodiments, the pre-defined amount is associated with one or more relevancy weightings defined in the conversation participation criteria.

In another embodiment, a method for updating user to user link score using one or more conversation segments may be provided. The method includes receiving a conversation segment. The conversation segment comprises one or more group-based communication messages and one or more sending user identifiers of the one or more group-based communication messages. The method further includes identifying the one or more sending user identifiers of each group-based communication message of the conversation segment. The method further includes determining one or more user identifiers of the sending user identifiers that satisfy conversation participation criteria. The method further includes updating user to user link score associated with each user identifier pair of the one or more user identifiers according to conversation segment-based user to user link score update criteria.

In some embodiments, the conversation participation criteria comprise one or more thresholds of percentage of group-based communication messages per conversation segment. In some embodiments, determining the one or more user identifiers of the sending user identifiers that satisfy the conversation participation criteria comprises: for each user identifier: determine a number of group-based communication messages associated with the user identifier in the conversation segment; determine a total number of group-based communication messages in the conversation segment; calculate the percentage of group-based communication messages per conversation segment for the user identifier by dividing the number of group-based communication messages associated with the user identifier in the conversation segment by the total number of group-based communication messages in the conversation segment; and determine that the percentage of group-based communication messages per conversation segment for the user identifier is higher than a lowest threshold of the one or more thresholds of percentage.

In some embodiments, updating the user to user link score comprises updating one or more user work graphs associated with each user identifier of each of the user identifier pairs. In some embodiments, updating the user to user link score comprises incrementing the user to user link score based on a pre-defined amount defined in the user link score update criteria. In some embodiments, the pre-defined amount is associated with one or more relevancy weightings defined in the conversation participation criteria.

BRIEF DESCRIPTION OF THE DRAWINGS

Figure 1:
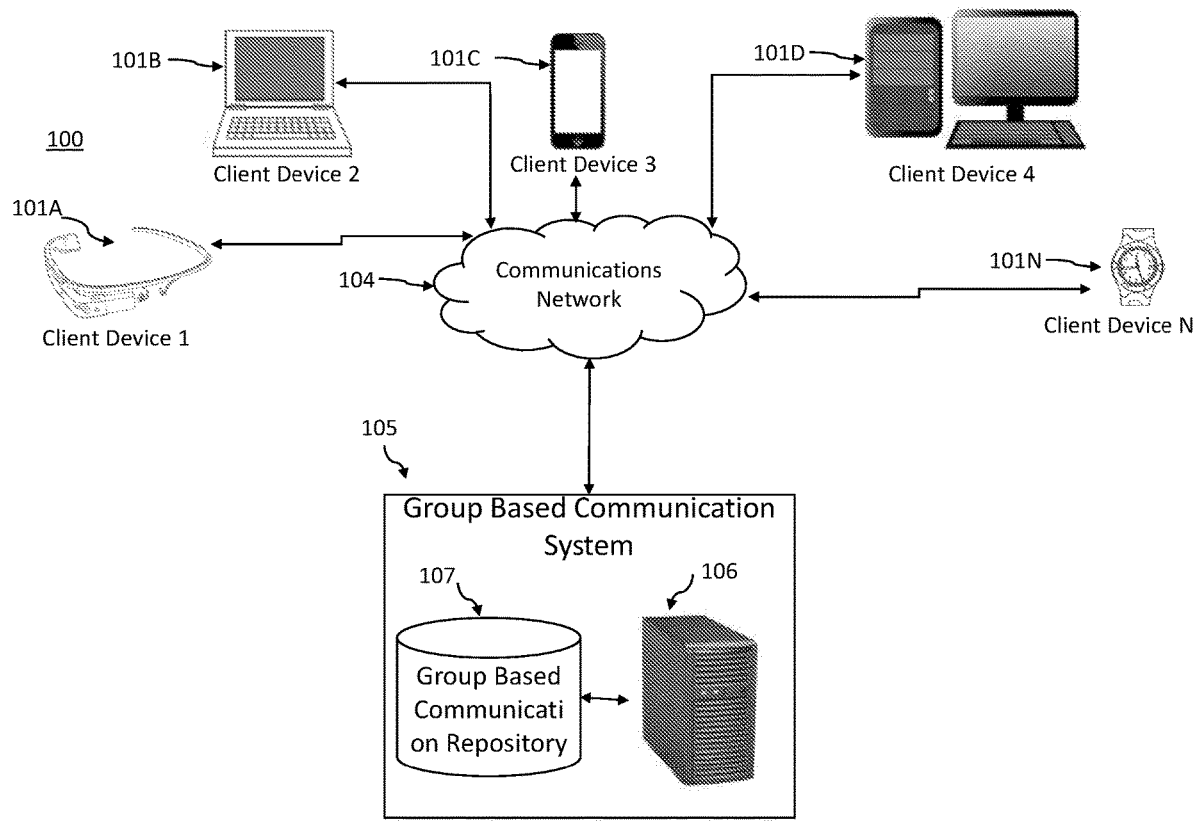
Figure 2:
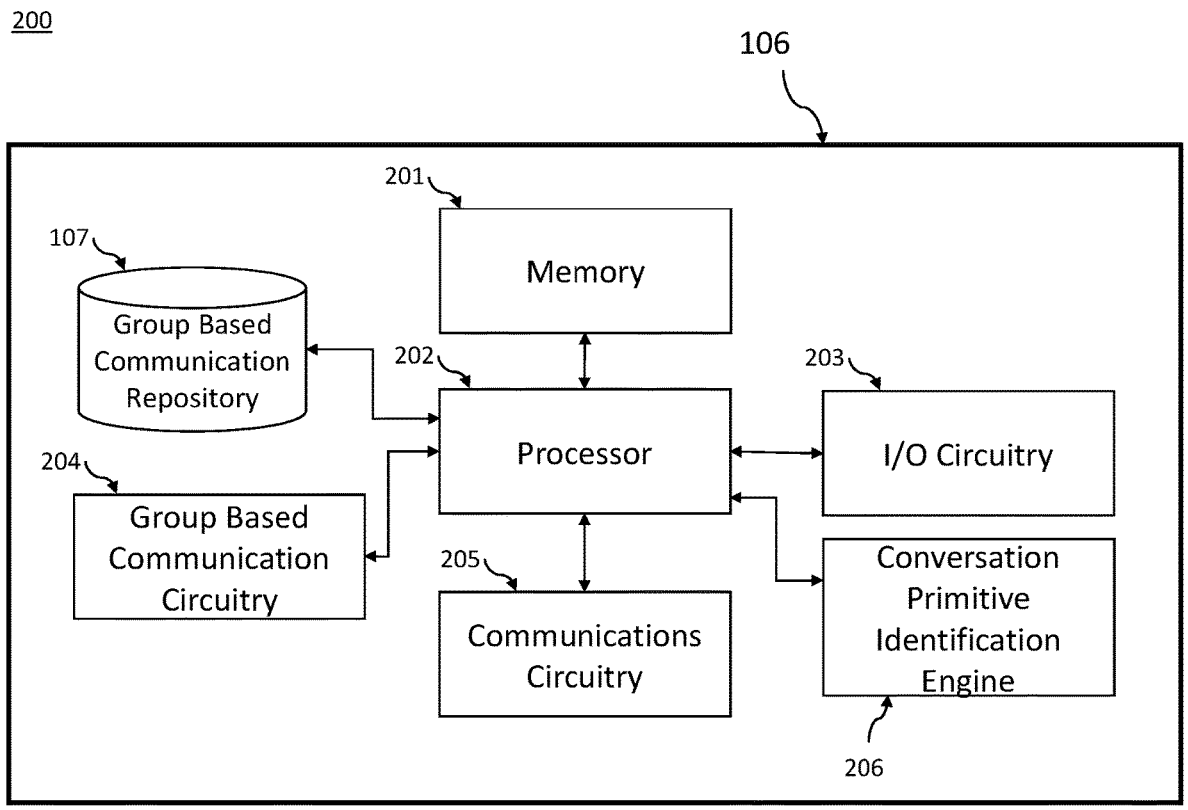
Figure 3:
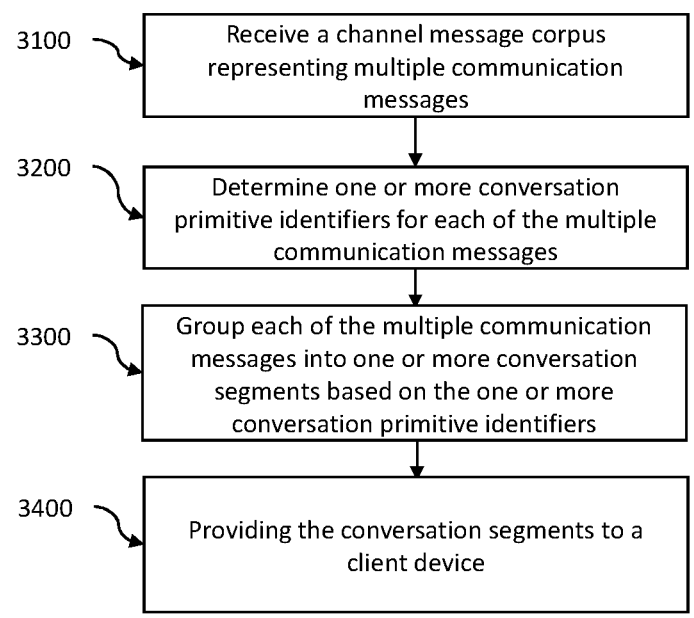
Figure 4:
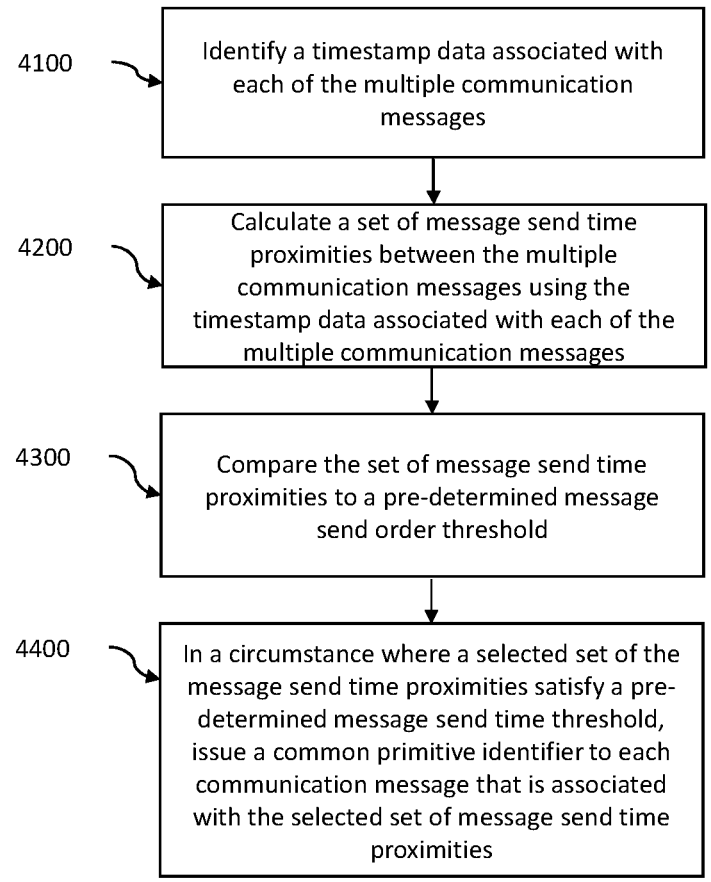
Figure 5:
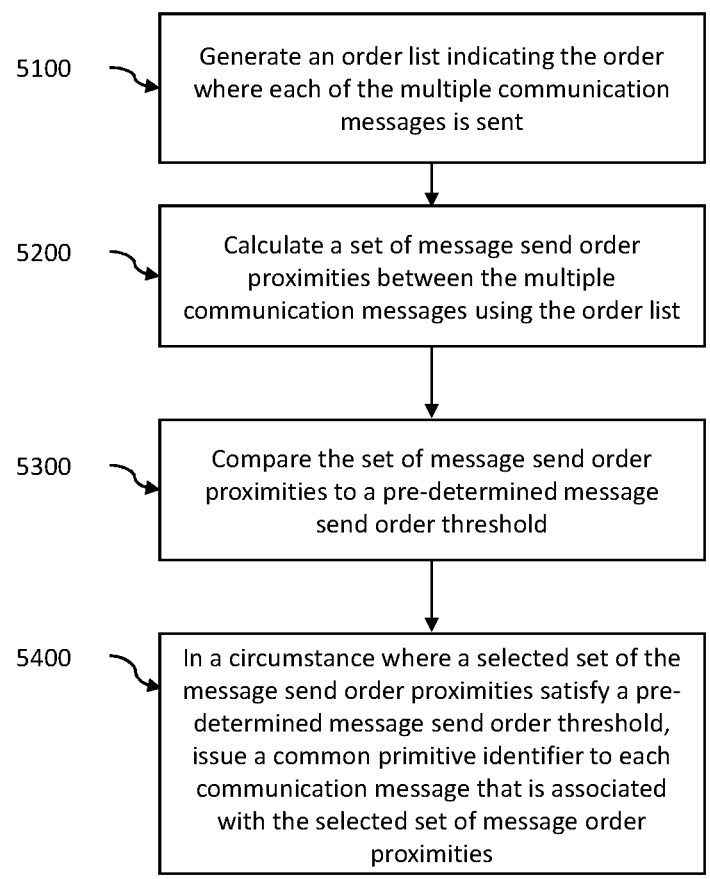
Figure 6:
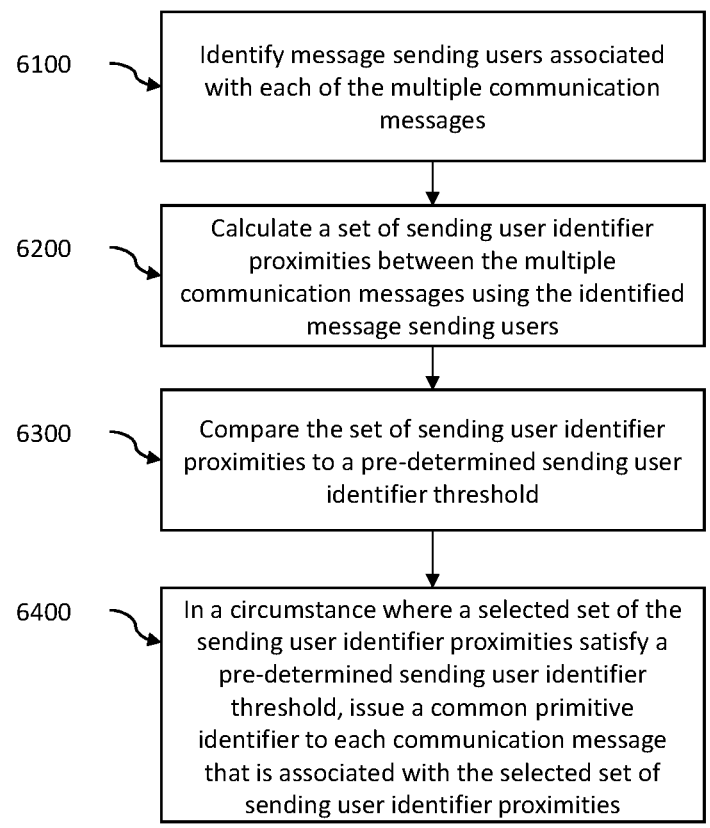
Figure 7:
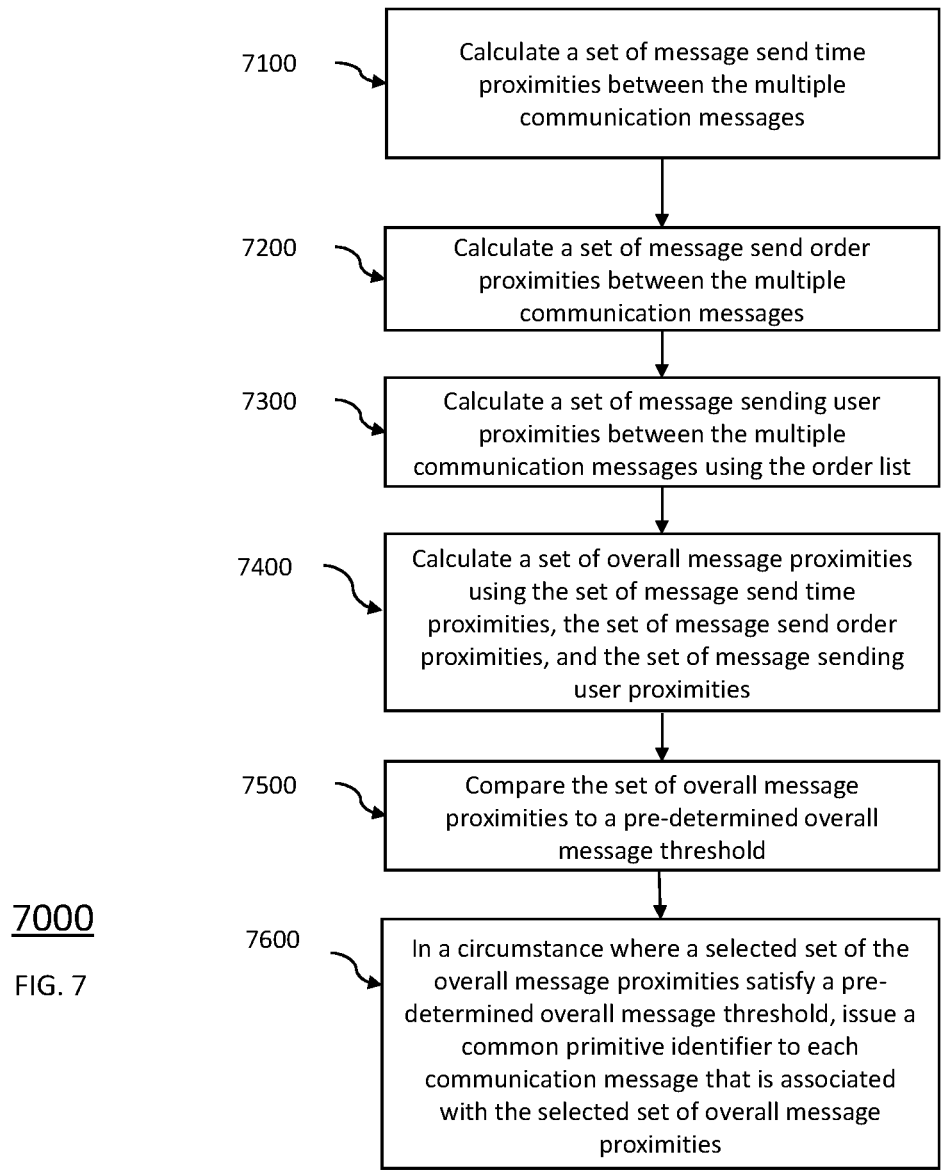
Figure 8:
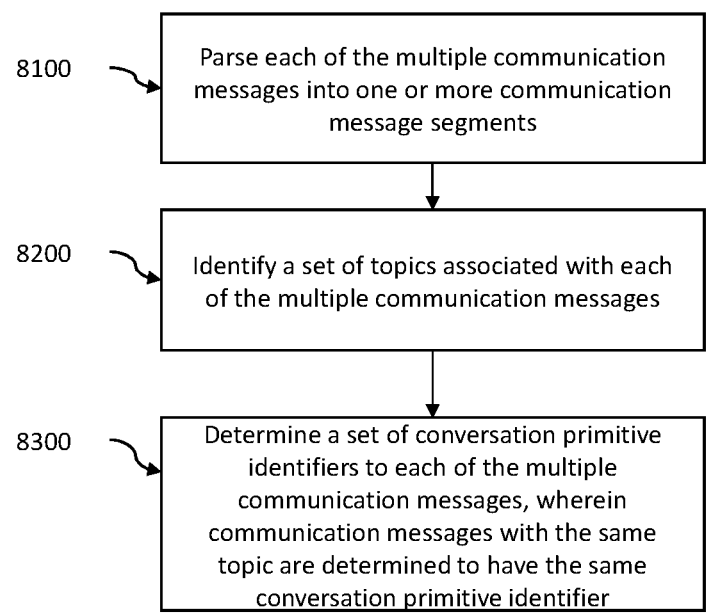
Figure 9:
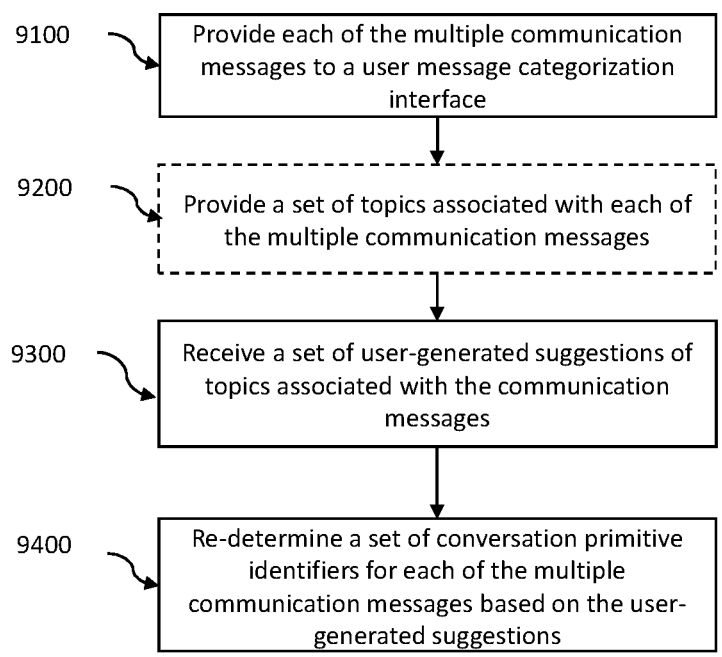
Figure 10:
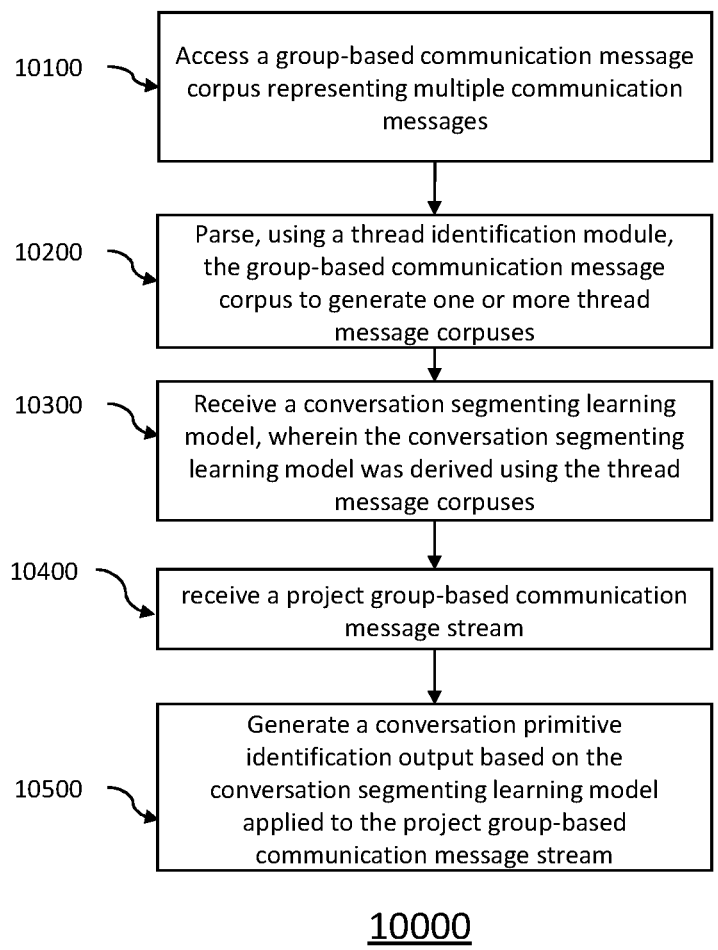
Figure 11:
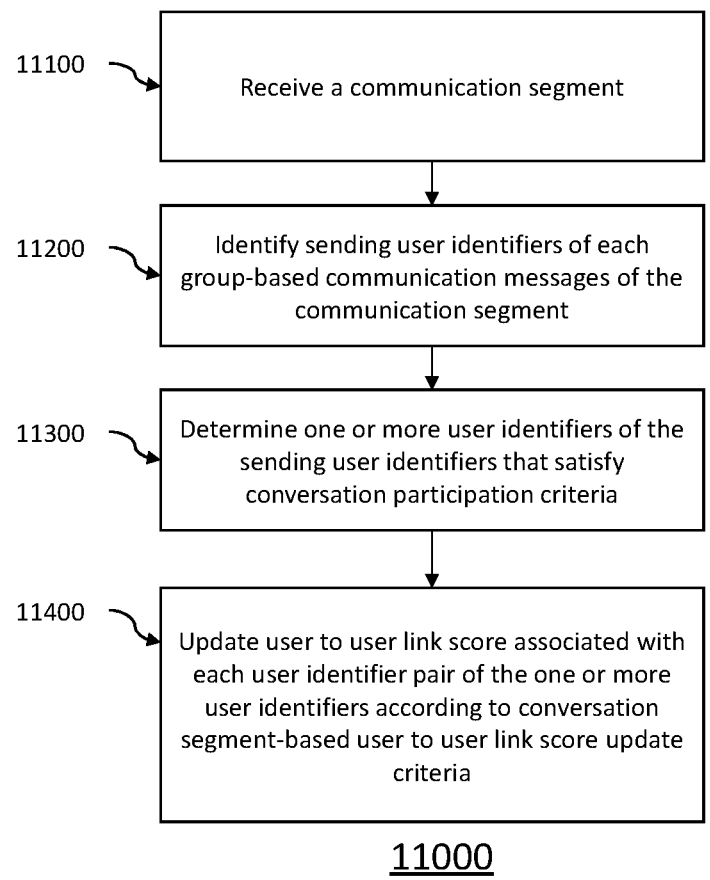
Figure 12:
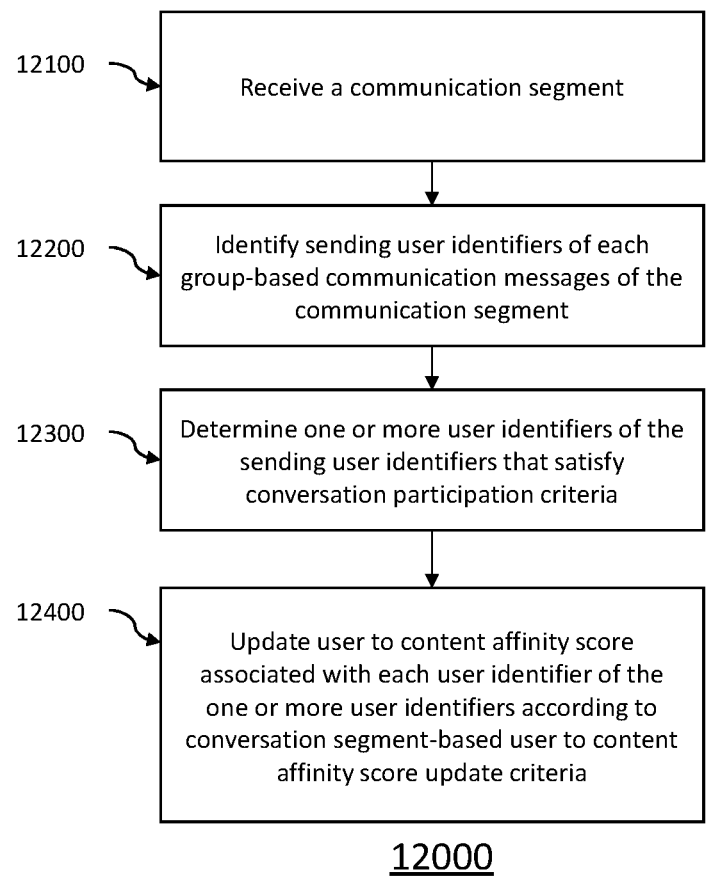
Figure 13:
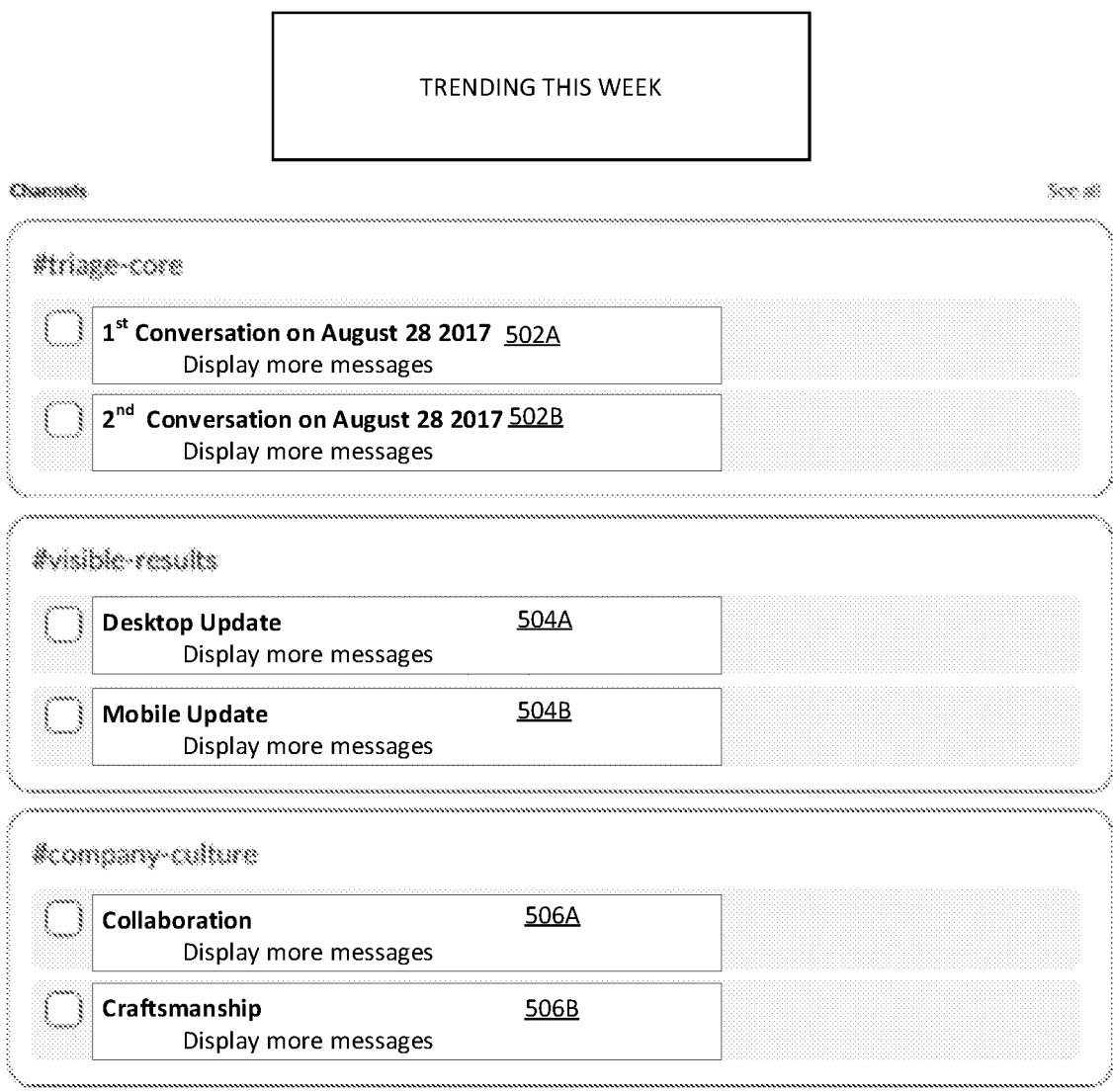

Having thus described the disclosure in general terms, reference will now be made to the accompanying drawings, which are not necessarily drawn to scale, and wherein:

FIG. 1 illustrates an example computing system 100 within which embodiments of the present disclosure may operate;

FIG. 2 shows exemplary apparatuses for implementing embodiments of the present disclosure;

FIG. 3 shows a flowchart of an example method 3000, which is an overview for categorizing multiple group-based communication messages in a workspace into one or more conversation segments, according to embodiments of the present disclosure;

FIG. 4 shows a flowchart of an example method 4000 for determining a set of conversation primitive identifiers using a set of message send time proximities, according to embodiments of the present disclosure;

FIG. 5 shows a flowchart of an example method 5000 for determining a set of conversation primitive identifiers using a set of message send order proximities, according to embodiments of the present disclosure;

FIG. 6 shows a flowchart of an example method 6000 for determining a set of conversation primitive identifiers using a set of sending user identifier proximities, according to embodiments of the present disclosure;

FIG. 7 shows a flowchart of an example method 7000 for determining a set of conversation primitive identifiers using multiple proximities, according to embodiments of the present disclosure;

FIG. 8 shows a flowchart of an example method 8000 for determining a set of conversation primitive identifiers based on topics, according to embodiments of the present disclosure;

FIG. 9 shows a flowchart of an example method 9000 for re-determining a set of conversation primitive identifiers based on user generated suggestions, according to embodiments of the present disclosure;

FIG. 10 shows a flowchart of an example method 10000 for generating a conversation primitive identification output, according to embodiments of the present disclosure;

FIG. 11 shows a flowchart of an example method 11000 for determining user to user link score using one or more conversation segments, according to embodiments of the present disclosure;

FIG. 12 shows a flowchart of an example method 12000 for determining user to content affinity score using one or more conversation segments, according to embodiments of the present disclosure; and FIG. 13 illustrates an example interface for presentation of discovered organizational telemetry data utilizing embodiments of the present disclosure.

DETAILED DESCRIPTION OF VARIOUS EMBODIMENTS

Various embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

As used herein, the term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) may be displayed to each member of the group-based communication channel. For instance, in one embodiment, a common set of group-based messaging communications will be displayed to each member of the respective group-based communication channel such that the content of the group-based communication channel (i.e., messaging communications) will not vary per member of the channel. However, in another embodiment, a member may join a group-based communication channel and only be able to view subsequent group-based messaging communications (as opposed to historical group-based messaging communications). The group-based communication channels are generally topic-oriented, long-lasting channels as opposed to ad hoc ephemeral conversations in conventional messaging apps.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, a plurality of historical conversation primitives associated with the user profile, an avatar, an email address, a real name (e.g., John Doe), a username (e.g., jdoe), a password, a real name, a time zone, a status, conversation segments associated with the user, metadata indicating historical messages with same conversation primitive shared with other user profiles, and the like. The user account details can include a subset designation of user credentials, such as, for example, login information for the user including the user's username and password.

As used herein, the term "profile identifier" refers to any data that identifies a user. For example, and without limitation, a profile identifier may include a unique identifier, an IP address, a MAC address, and the like. In some embodiments, the profile identifier may be "highlight words" which are words/terms that a member requests to follow. For instance, when a highlight word is used in a thread communication message, the associated member may be notified of such communication (e.g., by displaying a thread indication as discussed herein).

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the terms "messaging communication," "communication message," and "message" refer to any electronically generated digital content object provided by a user using a client device and that is configured for display within a group-based communication channel. Communication messages may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a timestamp associated with post of the message, a sending user identifier, a message identifier, message contents, a group identifier, a group-based communication channel identifier, a thread identifier, and the like. Each of the foregoing identifiers may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "group-based communication repository" refers to a location outside the client device where data is stored, accessed, modified and otherwise maintained by the group-based communication system. The stored data includes information that facilitates the operation of the group-based communication system. The group-based communication repository may be embodied as a data storage device or devices, as a separate database server or servers, or as a combination of data storage devices and separate database servers. Further, in some embodiments, the group-based communication repository may be embodied as a distributed repository such that some of the stored data is stored centrally in a location within the group-based communication system and other data stored in a single remote location or a plurality of remote locations. Alternatively, in some embodiments, the group-based communication repository may be distributed over a plurality of remote storage locations only.

As used herein, the term "third party application" refers to a software program, platform, or service that is accessible to or accessible through, or configured to perform functions within the group-based communication system. The third party application may be integrated in a group workspace (i.e., a group-based communication interface) within a group-based communication system via an app user. For example, a third party application may be a Software as a Service ("SaaS") product or an Application ("App") product that is provided by a third party application provider and which is stored and maintained by a third party application provider. In such an example, a client device accessing the group-based communication system may access the SaaS or App product via a group-based communication interface that a user of the client device is associated with.

As used herein, the term "third party application provider" refers to a provider of a third party application by way of a remote networked device, such as a server or processing device, maintained by a third party individual, company, or organization. A client device in a group-based communication system may access a third party application provided by the third party application provider to execute functions, flows, or actions. In some embodiments, the functions, flows, or actions produce an effect (e.g., an output, change, data modification, etc.) within the group-based communication system such as, for example, by manipulating data within the group-based communication system or posting messages within the group-based communication system, or executing some other action such as providing content to the group-based communication system for rendering in a group-based communication interface. In other embodiments, the functions, flows, or actions take effect within the third party application provider to produce an effect within the third party application provider. In yet other embodiments, the functions, flows, or actions produce effects within various combinations of the group-based communication system, the third party application provider, and other servers or systems.

As used herein, the term "third party application provider identifier" refers to one or more items of data by which a third party application provider that provides a third party application in a group-based communication system may be identified. For example a third party application provider identifier may comprise ASCII text, a pointer, a memory address, and the like.

As used herein, the term "third party application identifier" refers to one or more items of data by which a third party application within a group-based communication system may be identified. For example, a third party resource identifier may comprise ASCII text, a pointer, a memory address, and the like.

As used herein, the term "group-based communication object" refers to a collection of data and instructions that represent an item or resource of the group-based communication system. Each group-based communication object has an object identifier that uniquely identifies a particular group-based communication object in the group-based communication system and an object type, which describes the category of objects to which the group-based communication object belongs. In some embodiments, users may perform actions via a group-based communication interface that create or modify group-based communication objects. Example group-based communication objects include group-based communication channels, user profile identifiers, indications of user profiles (such as pointers with reference to user profiles), files created and maintained in the group-based communication system, files linked or uploaded to the group-based communication system, user accounts, emojis posted in a group-based communication channel, emojis available in a group-based communication channel, metadata associated with group-based communication messages such as an author identifiers, a post timestamp, a channel identifier, user identifiers of users with access rights to the group-based communication message, and the like.

As used herein, the term "group-based communication message corpus" refers to a collection of communication messages in one or more workspaces. In some embodiments, group-based communication message corpus are constructed by combining multiple channel message corpuses. In some embodiments, a channel message corpus is constructed by periodically collecting group-based communication messages based on time stamp data. In some embodiments, a channel message corpus is constructed by collecting group-based communication messages after a defined number of messages with identical group-based communication channel identifier or thread identifier is received. In some embodiments, a channel message corpus is constructed by collecting group-based communication messages after receiving a request (such as a user request) to construct a channel message corpus. In some embodiments, a channel message corpus is constructed by collecting group-based communication messages in a thread communication that initiated in a channel. In some embodiments, a channel message corpus is constructed in accordance with other construction criteria defined by a message corpus construction learning model.

As used herein, the term "channel message corpus" refers to a collection of communication messages in a group-based communication channel. In some embodiments, channel message corpus are constructed based on a pre-defined trigger. In some embodiments, a channel message corpus is constructed by periodically collecting group-based communication messages based on time stamp data. In some embodiments, a channel message corpus is constructed by collecting group-based communication messages after a defined number of messages with identical group-based communication channel identifier or thread identifier is received. In some embodiments, a channel message corpus is constructed by collecting group-based communication messages after receiving a request (such as a user request) to construct a channel message corpus. In some embodiments, a channel message corpus is constructed by collecting group-based communication messages in a thread communication that initiated in a channel. In some embodiments, a channel message corpus is constructed in accordance with other construction criteria defined by a message corpus construction learning model.

As used herein, the term "thread message corpus" refers to a collection of communication messages in a thread communication. The thread communication may be initiated in a group-based communication channel. In some embodiments, thread message corpus are constructed based on a pre-defined trigger. In some embodiments, a thread message corpus is constructed by periodically collecting group-based communication messages based on time stamp data and thread identifier. In some embodiments, a thread message corpus is constructed by collecting group-based communication messages after a defined number of messages with identical thread identifier is received. In some embodiments, a thread message corpus is constructed by collecting group-based communication messages after receiving a request (such as a user request) to construct a thread message corpus. In some embodiments, a thread message corpus is constructed in accordance with other construction criteria defined by a message corpus construction learning model.

As used herein, the term "conversation segment" refers to a set of communication messages grouped by a server in a group-based communication system where all communication messages within the conversation segment are determined to have at least one identical conversation primitive identifier. In some embodiments, communication messages in one conversation segment are directed to the same topic. In some embodiments, a set of communication messages in one conversation segment may be thread communication messages in one particular thread. In some embodiments, the set of communication messages in one conversation segment may be non-thread communication messages that shares the same topic. In some embodiments, the set of communication messages in one conversation segment has message send order proximity, message send time proximity, and sending user identifier proximity that exceeds a respective defined threshold. In some embodiments, one conversation segment may be determined to be related to another conversation segment and one conversation segment may include several conversation segments. In some embodiments, a conversation segment may be grouped by a server by using a conversation segmenting learning model. In some embodiments, a conversation segment may further include the conversation primitive identifier. In some embodiments, a conversation segment may include a topic associated with the conversation segment.

As used herein, the term "project group-based communication message stream" refers to a collection of uncategorized communication messages. The project group-based communication message stream may be a group-based communication message corpus, a channel message corpus, or a thread message corpus.

As used herein, the term "conversation primitive identifier" refers to an element used to analyze, index, store, communication messages. In one embodiment, a conversation primitive identifier may be determined based on analysis of topics discussed in the communication message and other communication messages (e.g., in the same channel or thread) and/or proximity (e.g., message send order proximity, message send time proximity, and/or sending user identifier proximity) of these messages. In another embodiment, a conversation primitive identifier may be determined based solely on message send order proximity, message send time proximity, and/or sending user identifier proximity. In some embodiments, the conversation primitive identifier is an identifier used by a learning model to indicate that a set of communication messages are in the same conversation segment. Different linguistic and natural language patterns may be used by the learning model or used to train the learning model.

As used herein, the term "conversation primitive identification output" refers to a collection of conversation primitive identifiers generated by a conversation primitive identification engine and the communication messages associated with the conversation primitive identifiers. The conversation primitive identification output may include one or more conversation primitive identifiers for one or more group-based messages.

As used herein, the term "message send order proximity" refers to a proximity measure for messages associated with the same channel identifier determined based on number of messages with the same channel identifier with time stamp data between two or more communication messages in the same group-based communication channel. In one example embodiment, if a user sends communication message A in a particular group-based communication channel and another user sends communication message B in the same channel before any other communication message is posted in the channel, message A and message B would be determined to have message send order proximity of 1 which indicates highest possible proximity in this embodiment.

As used herein, the term "message send time proximity" refers to a proximity measure determined based on difference of time in time stamp data associated with two or more communication messages in the same group-based communication channel. In one example embodiment, if a user sends communication message A in a particular group-based communication channel at 19:02:35 and another user sends communication message B in the same channel at 19:02:40, message A and message B would be determined to have message send time proximity of 5 seconds.

As used herein, the term "sending user identifier proximity" refers to a proximity measure determined based on how closely related the sending users of two or more communication messages in the same group-based communication channel are. For example, if the sending user for two communication messages are the same user, the two communication messages will be determined to have the highest sending user identifier proximity. In another example, if the sending user for two communication messages shares multiple common workspaces and/or group-based communication channels, the two communication messages will be determined to have a high sending user identifier proximity. If the sending user for two communication messages shares only one common workspaces and/or group-based communication channels, the two communication messages will be determined to have a low sending user identifier proximity.

As used herein, the term "communication message segment" refers to a parsed fraction of a communication message. A communication message may be parsed for various purposes, such as determining topics discussed in the communication message. For example, hashtags in the message may indicate topics associated with the message. In another example, the message may be parsed using a machine learning technique, such as topic modeling (e.g., Latent Dirichlet allocation topic modeling), to determine topics associated with the message. Additionally or alternatively, other natural language processing machine learning algorithms and techniques, such as neural network with word embedding and/or negative sampling may also be utilized.

Thread communication messages are communications received in threads. Otherwise, the group-based messaging communications are generally initiated in channels. A "thread" is a collection of communication messages displayed to a subsidiary feed arising from or otherwise associated with a selected group-based messaging communication displayed in a selected group-based communication channel. A thread may include one or more "threaded messages" or "thread communication messages" that are linked together in the subsidiary feed, wherein each is associated with the selected group-based messaging communication. In some embodiments, a thread may be automatically suggested or created if a set of non-thread communication messages communication messages that form a conversation segment is detected in a group-based communication channel.

A "new messaging communication" or a new communication message is a communication that the selected group-based communication interface has not yet presented to a particular member (that is, the member viewing the interface).

Because a thread is linked to a selected group-based messaging communication it arises in the context of a particular group-based communication channel. However, the thread is presented separately from the group-based messaging communications displayed within the selected group-based communication channel. Thread communication messages received in the thread are not automatically displayed in the selected group-based communication channel. Instead, the selected group-based communication channel is updated with a thread summary indicator that is configured to indicate that the thread was established and to indicate the receipt of subsequent thread communication messages in the thread. In some embodiments, a member can choose to override this such that the thread communication message also appears in the selected group-based communication channel.

As used herein, "thread summary indicator" refers to a visual identifier that indicates that an action has been taken with regards to a thread (e.g., a thread has been created, a thread communication message has been received in the thread, and/or that a profile identifier was received in the thread). A "notification" is a specific indication configured to indicate the number of new messaging communications (e.g., new thread communication message) and new threads that the selected group-based communication interface has not yet presented to a particular member (that is, the member viewing the interface).

As used herein, "defined display window" is a defined area in the selected group-based communication interface where information is displayed. A "channel list pane" is a display pane configured to display lists of group-based communication channels and/or threads that are configured to indicate when new messaging communications are received in the respective threads and/or group-based communication channels. The channel list pane may include actuators for initiating requests to view selected group-based communication channels and/or a summary of selected threads. The channel list pane may include additional information, such as messaging communication information, notifications, the name of the group, name of the particular member viewing the interface, etc. A "thread communication pane" is a display pane that is configured to display a selected thread. The thread communication pane may include a variety of information, such as messaging communication information, and may include a variety of actuators for initiating requests. A "thread summary communication pane" is a display pane that is configured to display a summary of threads that the particular member follows. The summary typically includes at least a portion of one or more thread communication messages as well as at least a portion of the selected group-based messaging communications from which the thread was created. The thread summary communication pane may also display various notifications, actuators, and indicators/indications. A channel messaging pane is a display pane configured to display a selected group-based communication channel and may display a variety of information and a variety of notifications, actuators, and indicators/indications.

As used herein, "messaging communication information" refers to any information associated with the messaging communication, such as information related to the user who created the messaging communication, the group-based communication channel on which the messaging communication was first provided or is associated with (e.g., the name of the group-based communication channel), the time and date that the messaging communication was first provided, threads stemming from the messaging communication (e.g., date and time the thread was made or last received a messaging communication, etc.), and any other identifying information related to the messaging communication.

As used herein, "request" refers to an instruction or direction, generally initiated by a user, for an action to take place. For instance, a user may request to view a specific group-based communication channel (e.g., selected channel view request), create a thread (e.g., thread request), view a selected thread (e.g., selected thread view request), view a summary of threads the user follows (e.g., thread summary view request), view profile data of another user, view certain messaging communication information, share a select thread communication message from a thread to the selected group-based communication channel from which the thread was created (e.g., share request), receive notifications regarding a thread (e.g., follow request), notify a selected member of a thread communication message (e.g., follow request), etc.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

A "work graph" is a graph-based knowledge representation data structure applied to the group-based communication platform data corpus that comprises relationships between users, between various data objects, such as between work objects, between users and work objects, between group-based communication channels and work objects, between topics and work objects, between users and group-based communication channels, between users and topics, between group-based communication channels and topics, between group-based communication channels, between topics, and/or the like. Attributes of work graph data may be represented as nodes while associations between such attributes are represented as edges. Work graph data may be used as machine learning (ML) structure inputs for training and/or utilizing ML structures (e.g., logistic regressions, neural networks, etc.). The group-based communication system may utilize work object metadata, channel metadata, and/or ML structures to rank work objects, users, channels, and/or the like for a variety of applications. For example, such applications may include prioritizing the most relevant work objects to a user's search query and presenting those most relevant work objects in response to a search query.

A user to user link score is a numerical value representing a user's association with other users. In some embodiments, a user to user link score is derived using a user work graph. A user work graph is a graph-based knowledge representation data structure applied to the group-based communication system data corpus that represents a user's associations to other users. Such other users may be drawn from group-based communication messaging data, external communication objects, or the like. In one implementation, user to user data include how many messages from another user the user read, how many messages of another user the user reacted to, how many direct messages the user sent to another user, how many channels the user and another user joined in common, how many emails are transmitted from an email address, how many conversation segments that the users share, and/or the like. Additionally or alternatively, user to user data include such as how may emails are transmitted between email addresses associated with the user and another user, recency of the emails transmitted between the email addresses associated with the user and another user, and/or the like. A weighted average of user to user data may be calculated for each of the other users from the perspective of the selected user, and the resulting scores normalized so that each of the other users is assigned a user to user link score (e.g., in the 0 to 1 range) from the perspective of the user. In some embodiments, one or more user to user link scores associated with particular topics may be present (or created/updated) for a user identifier pair.

A user to content affinity score is a numerical value representing a user's associations to topics. In some embodiments, a user to user link score is derived using a topic work graph. A topic work graph is a graph-based knowledge representation data structure applied to the group-based communication system data corpus that represents a user's associations to topics. Such topics may be drawn from group-based communication messaging data, group-based communication channel data, and group-based communication work object data and external communication object. In some embodiments, topics may be identified from a group-based communication message or an external communication object. The message contents or the content in the external communication may be parsed (e.g., using PHP commands) to determine topics discussed in the message/email. For example, hashtags in the message/email may indicate topics associated with the message/email. In another example, the message/email may be analyzed (e.g., by itself, with other messages/emails in a conversation primitive or parsed using a machine learning technique, such as topic modeling, to determine topics associated with the message. The topic work graph may indicate, for example, how many messages/emails a user sent regarding a topic, how many messages the user read regarding the topic, how many reactions to the user's messages/emails regarding the topic have been received, how many times files regarding the topic that were attached to the user's messages/emails have been downloaded by other users, how many times files regarding the topic have been downloaded by the user, and relative strengths of the user's associations with such topics. This data structure may be used to calculate a prioritization weight estimate of the topic to the user. For example, a weighted average of user to topic data may be calculated for each topic (e.g., each topic discussed by the team, each topic discussed at the company), and the resulting scores normalized so that each of the topics is assigned a prioritization weight estimate (e.g., in the 0 to 1 range) from the perspective of the user.

As used herein, the term "conversation participation criteria" refers to one or more thresholds of number or percentage of group-based communication messages associated with one particular user identifier per conversation segment and optionally relevancy weighting associated with the one or more thresholds. For example, if a conversation segment comprises 200 group-based communication messages, the conversation participation criteria may define that a sending user identifier associated with a minimum of 10, or 5% of total group-based communication messages in the conversation segment, is determined to satisfy the conversation participation criteria (and/or determined to have a weighting of 1). A sending user identifier associated with a minimum of 40, or 20% of total group-based communication messages in the conversation segment, is determined to have a weighting of 2. Conversation participation criteria may be used to determine a user's relevancy with the conversation segment, which may in turn be used to update a user to user link score between user identifiers identified in the conversation segment and/or a user to content affinity score between user identifiers identified in the conversation segment and a topic associated with the conversation segment.

As used herein, the term "conversation segment-based user to user link score update criteria" refers to a set of rules defining updating of user to user link score based on conversation segments, such as based on conversation participation criteria. For example, conversation segment-based user to user link score update criteria may define that for all user identifiers that satisfied the minimum threshold defined in conversation participation criteria, the user to user link score associated with each user identifier pair of the user identifiers may be incremented by a pre-defined amount. The conversation segment-based user to user link score update criteria may further define that the pre-defined amount is correlated with relevancy weighting as determined by the conversation participation criteria associated with each user identifier in the user identifier pair.

As used herein, the term "conversation segment-based user to content affinity score update criteria" refers to a set of rules defining updating of user to content affinity score based on conversation segments, such as based on conversation participation criteria. For example, conversation segment-based user to content affinity score update criteria may define that for all user identifiers that satisfied the minimum threshold defined in conversation participation criteria, the user to content affinity score associated with each user identifier of the user identifiers and a topic associated with the conversation segment may be incremented by a pre-defined amount. The conversation segment-based user to content affinity score update criteria may further define that the pre-defined amount is correlated with relevancy weighting as determined by the conversation participation criteria associated with each of the user identifiers.

Overview

Various embodiments of the present disclosure generally relate to a method and apparatus for categorizing multiple group-based communication messages in a workspace in a group-based communication system. Traditionally, a group-based communication system categorizes group-based communication messages in a workspace in pre-defined categories such as group-based communication channels and threads. A group-based communication user inputs a group-based communication message into an input field associated with a pre-defined category in a group-based communication interface rendered on a client device. After the client device receives the user input, the client device transmits the group-based message metadata indicating the pre-defined category to a group-based communication system. The group-based communication system would then categorize the group-based communication message based on the pre-defined category. As a result, a group-based communication system categorizes group-based communication messages based entirely on the input field associated with the group-based communication message. However, group-based communication messages transmitted using the same input field may not be relevant to each other. For example, a user may post a message in channel "Security Risk Analysis" and another completely unrelated message may be posted in the same channel afterwards. A user may want to view communication messages that are related to each other. In other words, a user may want to view historical communication messages based on conversations the communication messages belong to. If categorization of communication messages are not provided, a user may need to request a large number of historical communication messages, resulting in high utilization of computing resources and/or network traffic.

Therefore, it would have been helpful to categorize the group-based communication messages based on the respective conversations that they belong to. As a result of the disclosures disclosed herein, a group-based communication system is capable of categorizing group-based communication messages based on the respective conversations that the messages belong to. The group-based communication system may determine a set of conversation primitive identifiers associated with communication messages based on various metrics, such as message send time proximity, message send order proximity and sending user identifier proximity. Communication messages with high proximities may be determined to have the same conversation primitive identifier. In addition, machine learning techniques such as topic modeling may be utilized to determine conversation primitive identifiers associated with the communication messages. Communication messages having the same conversation primitive identifier may be determined to be part of one conversation.

The various embodiments disclosed provide for a mechanism to categorize communication messages based on conversations. Therefore, communication messages from the same conversation can be provided to a user for reference. A user would not need to request a large number of historical messages to view messages in the same conversation which in turn saves network traffic resources, server processing capacity, client memory footprint, and other computing resources. In addition, using conversation can greatly improve user search experience because a user can search for conversations instead of individual messages. A group-based communication interface may be able to provide and render indications of conversations instead of individual messages which makes the group-based communication interface more compact and reduces information overload. Categorizing communication messages based on conversations also improves efficiency of performing other downstream tasks such as better summarization of information.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 105 via a communications network 104 using client devices 101A-101N. The group-based communication system 105 may comprise a group-based communication server 106 in communication with at least one group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON (JavaScript Object Notation) objects sent via a Websocket channel. In some embodiments, the protocol is JSON over RPC ("remote procedure call), JSON over REST ("Representational State Transfer")/HTTP ("HyperText Transfer Protocol"), and the like.

The group-based communication server 106 may be embodied as a computer or computers as known in the art. The group-based communication server 106 may provide for receiving of electronic data from various sources, including but not necessarily limited to the client devices 101A-101N. For example, the group-based communication server 106 may be operable to receive and post or transmit group-based messaging communications provided by the client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smartphone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message or messaging communication may be sent from a client device 101A-101N to a group-based communication system 105. In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
```

```
<client_details> //iOS Client with App and Webkit
    //it should be noted that although several client details
    //sections are provided to show example variants of client
    //sources, further messages will include only on to save
    //space
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>app with webkit</client_app_type>
    <app_installed_flag>true</app_installed_flag>
    <app_name>nickname.app</app_name>
    <app_version>1.0 </app_version>
    <app_webkit_name>Mobile Safari</client_webkit_name>
    <client_version>537.51.2</client_version>
</client_details>
<client_details> //iOS Client with Webbrowser
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
<client_details>
<client_details>//Android Client with Webbrowser
    <client_IP>10.0.0.123</client_IP>
    <user_agent_string>Mozilla/5.0 (Linux; U; Android 4.0.4; en-us; Nexus S Build/IMM76D)
AppleWebKit/534.30 (KHTML, like Gecko) Version/4.0 Mobile Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-
XXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
</client_details>
<client_details>//Mac Desktop with Webbrowser
    <client_IP>10.0.0.123</client_IP>
    <user_agent_string>Mozilla/5.0 (Macintosh; Intel Mac OS X 10_9_3)
AppleWebKit/537.75.14 (KHTML, like Gecko) Version/7.0.3 Safari/537.75.14</user_agent_string>
    <client_product_type>MacPro5,1</client_product_type>
    <client_serial_number>YXXXXXXXXZ</client_serial_number>
    <client_UDID>FXXXXXXXXX-XXXX-XXXX-XXXX-
XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
</client_details>
<message>
    <message_identifier>ID_message_10</message_identifier>
    <team_identifier>ID_team_1</team_identifier>
    <channel_identifier>ID_channel_1</channel_identifier>
    <contents>That is an interesting invention. I have attached a copy our patent
policy.</contents>
    <attachments>patent_policy.pdf</attachments>
</message>
</auth_request>
```

The group-based communication system 105 comprises at least one group-based communication server 106 that may create a storage message based upon the received message to facilitate message indexing and storage in a group-based communication repository 107. In one implementation, the storage message may include data such as a message identifier, a group identifier, a group-based communication channel identifier, a sending user identifier, topics, responses, message contents, attachments, message hierarchy data, third party metadata, conversation primitive identifier data, and/or the like. For example, the group-based communication server 106 may provide the following example storage message, substantially in the form of a HTTP(S) POST message including XML-formatted data, as provided below:

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP—i.e. the script language derived from Personal Home Page Tools—commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive identifier) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive identifier may be associated with the message. In one implementation, a conversation primitive identifier is an element used to analyze, index, store, and/or the like messages. In one embodiment, a conversation primitive identifier may be determined based on analysis of topics discussed in the communication message and other communication messages (e.g., in the same channel or thread) and/or proximity (e.g., message send order proximity, message send time proximity, and/or sending user identifier proximity) of these messages. In another embodiment, a conversation primitive identifier may be determined based solely on message send order proximity, message send time proximity, and/or sending user identifier proximity. For example, the message may be analyzed by itself, and may form its own conversation primitive identifier. In another example, the message may be analyzed along with other messages that make up a conversation, and the messages that make up the conversation may form a conversation primitive identifier. In one implementation, the conversation primitive identifier may be determined as the message, a specified number (e.g., two) of preceding messages and a specified number (e.g., two) of following messages. In another implementation, the conversation primitive identifier may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive identifier) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

The group-based communication server 106 may be embodied by one or more computing systems, such as apparatus 200 shown in FIG. 2. The apparatus 200 may include a processor 202, a memory 201, input/output circuitry 203, communications circuitry 205, group-based communication repository 107 and group-based communication circuitry 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed. In some embodiments, the processor 202 is coupled with a conversation primitive identification engine 206.

The conversation primitive identification engine 206 may take the form of, for example, a code module, a component, circuitry and/or the like. The conversation primitive identification engine 206 may include a conversation segmenting learning model derived by, for example, training using thread message corpuses. In some examples, the conversation primitive identification engine 206 is configured to access or otherwise ingest thread message corpuses or other collections of group-based communication messages or objects in the group-based communication repository 107. In some embodiments, the conversation primitive identification engine 206 include a thread identification module configured to parse a group-based communication message corpus to generate one or more thread message corpuses.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of enterprise-based digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Categorizing Multiple Group-Based Communication Messages in a Workspace

FIG. 3 shows a flowchart of an example method 3000, which is an overview for categorizing multiple group-based communication messages in a workspace into one or more conversation segments performed by the server 106. Method 3000 is meant to show a high level example, while some of the other process flows discussed in relation to later figures show more detailed examples.

At 3100, the server 106 is configured to receive a channel message corpus representing multiple communication messages. A channel message corpus is a collection of communication messages in a group-based communication channel. The message corpus may be received from an internal database, such as a group-based communication repository 107. In some embodiments, the channel message corpus is previously constructed by the server 106 based on a pre-defined trigger then stored in group-based communication repository 107. In some embodiments, the channel message corpus is previously by the server 106 by periodically collecting group-based communication messages based on time stamp data then stored in group-based communication repository 107. In some embodiments, a channel message corpus is constructed by the server 106 by collecting group-based communication messages after a defined number of messages with identical group-based communication identifiers is received. In some embodiments, a channel message corpus is constructed by the server 106 by collecting group-based communication messages after receiving a user request to construct a channel message corpus. In some embodiments, a channel message corpus is constructed by the server 106 in accordance with other construction criteria defined by a message corpus construction learning model. In some embodiments, each of the multiple communication messages of the channel message corpus share a common group-based communication channel identifier.

After the server 106 receives the channel message corpus, at 3200, the server 106 is configured to determine one or more conversation primitive identifiers for each of the multiple communication messages in the channel message corpus. The server 106 may utilize the conversation primitive identification engine 206 to determine the one or more conversation primitive identifiers. Conversation primitive identifier is an element used to analyze, index, store, communication messages. In one embodiment, a conversation primitive identifier may be determined based on analysis of topics discussed in the communication message and other communication messages (e.g., in the same channel or thread) and/or proximity (e.g., message send order proximity, message send time proximity, and/or sending user identifier proximity) of these messages. In another embodiment, a conversation primitive identifier may be determined based solely on message send order proximity, message send time proximity, and/or sending user identifier proximity. Details regarding determining conversation primitive identifier based on the different types of proximity identifiers are later described in conjunction with FIGS. 4-8. In some embodiments, multiple conversation primitive identifiers may be determined for one message.

After the server 106 determines one or more conversation primitive identifiers for each of the multiple communication messages, at 3300, the server 106 is configured to group each of the multiple communication messages into one or more conversation segments based on the conversation primitive identifier determined. In some embodiments, communication messages with the same conversation primitive identifier are grouped together to construct a conversation segment. In some embodiments, a communication message may be grouped into multiple conversation segments.

In some embodiments, the server 106 may utilize a conversation segmenting learning model in the conversation primitive identification engine to determine one or more conversation primitive identifiers for each of the multiple communication messages and group each of the multiple communication messages into one or more conversation segments based on the conversation primitive identifier determined. The conversation segmenting learning model may be a supervised or unsupervised learning model configured to group one or more communication messages into one or more conversation segments. For example, the conversation segmenting learning model may be a natural language processing learning model such as a neural network based learning model with word embedding techniques. If the conversation segmenting learning model is a supervised learning model, one example way of gathering training data to the conversation segmenting learning model is described later in conjunction with FIG. 9. In some embodiments, the conversation segmenting learning model may be derived (i.e., trained) by using one or more thread message corpuses. Example operations related to the conversation primitive identification engine 206 are described later in conjunction with FIG. 10.

In some embodiments, different methods of generating the one or more conversation primitive identifiers such as example methods 4000, 5000, 6000, 7000, and 8000 described in conjunction with FIGS. 4-8 may be utilized to generate the one or more conversation primitive identifiers. For example, for one message, a conversation primitive identifier may be generated by utilizing example method 4000 and another conversation primitive identifier may be generated by utilizing example method 6000. The server 106 may be configured to group each of the multiple communication messages into one or more conversation segments only if the one or more conversation primitive identifiers for the each of the multiple communication messages satisfy a pre-defined conversation primitive identifier criteria. For example, the server 106 may be configured to group one or more communication messages into one or more conversation segments only if the one or more communication messages share a common conversation primitive identifier generated based on topic (generated for example, by utilizing method 8000) and further share a common conversation primitive identifier generated based on proximity (generated for example, by utilizing method 4000, 5000, 6000, or 7000). In some embodiments, the example methods 4000, 5000, 6000, or 7000 may be performed sequentially. In some embodiments, the example methods 4000, 5000, 6000, or 7000 may be performed in parallel. In some embodiments, the server 106 may store the topic associated with the one or more communication messages into the conversation segment as well.

A conversation segment is a set of communication messages grouped by a server in a group-based communication system where all communication messages within the conversation segment are determined to have at least one identical conversation primitive identifier. In some embodiments, communication messages in one conversation segment are directed to the same topic. In some embodiments, a set of communication messages in one conversation segment may be thread communication messages in one particular thread. In some embodiments, the set of communication messages in one conversation segment may be non-thread communication messages that shares the same topic. In some embodiments, the set of communication messages in one conversation segment has message send order proximity, message send time proximity, and sending user identifier proximity that exceeds a respective defined threshold.

After grouping each of the multiple communication messages into one or more conversation segments based on the conversation primitive identifier determined, the server 106 is configured to, at 3400, provide the conversation segments to a client device 101. In some embodiments, the server 106 is configured to provide the conversation segments to a client device 101 upon request. For example, a client device 101 may be configured to render an interactive conversation segment button in a group-based communication interface. Once a user interacts with the interactive conversation segment button in the group-based communication interface, the client device 101 may be configured to request the conversation segments from the server 106. In some alternative embodiments, the server 106 is configured to provide the conversation segments to a client device 101 independent of user request.

The server 106 is also configured to store the conversation segments, along with any conversation primitive identifiers generated, to group-based communication repository 107.

In some embodiments, the conversation primitive identifiers and the one or more conversation segments may be used as training data or otherwise used for one or more machine learning models for one or more of: generating group-based communication channel creation recommendations associated with one or more topics associated with one or more conversation segments, generating recommendations on one or more third party resources determined to be related to one or more conversation segments; generating one or more answers to one or more questions associated with an organizational identifier, a group-based communication channel identifier, or the like.

Determining Conversation Primitive Identifiers Based on Message Send Time Proximity Referring now to FIG. 4, FIG. 4 shows a flowchart of an example method 4000 for determining a set of conversation primitive identifiers using a set of message send time proximities which may be used to perform operation 3200.

At 4100, the server 106 is configured to identify a timestamp data associated with each of the multiple communication messages. After the server 106 identifies a timestamp data associated with each of the multiple communication messages, the server 106 is configured to, at 4200, calculate a set of message send time proximities between the multiple communication messages using the timestamp data associated with each of the multiple communication messages Message send time proximity is a proximity measure determined based on difference of time in time stamp data associated with two or more communication messages in the same group-based communication channel. In one example embodiment, if a user sends communication message A in a particular group-based communication channel at 19:02:35 and another user sends communication message B in the same channel at 19:02:40, message A and message B would be determined to have message send time proximity of 5 seconds. In some embodiments, message send time proximities between each of the communication messages may be calculated. Alternatively, message send time proximities may be calculated between communication messages that do not have another communication message with timestamp in between the communication messages.

After the server 106 calculates the set of message send time proximities between the multiple communication messages, the server 106 is configured, at 4300, to compare the set of message send time proximities to a pre-determined message send order threshold.

After the server 106 compares the set of message send time proximities to a pre-determined message send order threshold, the server 106 is configured, at 4400, issue a common primitive identifier to each communication message that is associated with the selected set of message time proximities in a circumstance where a selected set of the message send time proximities satisfy the pre-determined threshold. In some embodiments, communication messages with message send time proximity exceeding a pre-defined send time threshold are determined to have the same conversation primitive identifier. For example, communication messages with message send time proximity below 30 seconds may be determined to have the same conversation primitive identifier. The pre-defined send time threshold may be provided by a send time threshold construction learning model.

Determining Conversation Primitive Identifiers Based on Message Send Order Proximity Referring now to FIG. 5, FIG. 5 shows a flowchart of an example method 5000 for determining a set of conversation primitive identifiers using a set of message send order proximities which may be used to perform operation 3200. At 5100, the server 106 is configured to generate an order list indicating a chronological order where each of the multiple communication messages was sent. The order list may be generated based on identified timestamp data associated with the communication messages. For example, if a timestamp associated with message A indicates that message A was sent at 21:07:01, a timestamp associated with message B indicates that message B was sent at 21:07:08, and a timestamp associated with message C indicates that message C was sent at 21:07:05, the order list for message A, B, and C may indicate [A, C, B] which reflects that message C was sent right after message A and message B was sent right after message C.

After the server 106 generates an order list indicating a chronological order where each of the multiple communication messages was sent, the server 106 is configured to, at 5200, calculate a set of message send order proximities between the multiple communication messages using the order list. A message send order proximity is a proximity measure for messages associated with the same channel identifier determined based on number of messages with the same channel identifier with time stamp data between two or more communication messages in the same group-based communication channel. In the previous example, message A and message C would be determined to have message send order proximity of 1 which indicates highest possible proximity in this embodiment. Message A and message B would be determined to have message send order proximity of 2.

After the server 106 calculates a set of message send order proximities between the multiple communication messages using the order list, the server 106 is configured to, at 5300, compare the set of message send order proximities to a pre-determined message send order threshold.

After the server 106 compares the set of message send order proximities to a pre-determined message send order threshold, the server 106 is configured to, at 5400, in a circumstance where a selected set of the message send time proximities satisfy a pre-determined message send time threshold, issue a common primitive identifier to each communication message that is associated with the selected set of message send time proximities. Communication messages with message send order proximity exceeding a pre-defined send order threshold are determined to have the same conversation primitive identifier. For example, communication messages with message send order proximity below 5 (less than 5 other messages sent in between the communication messages) may be determined to have the same conversation primitive identifier. The pre-defined send order threshold may be provided by a message send order threshold construction learning model.

Determining Conversation Primitive Identifiers Based on Sending User Identifier Proximity Referring now to FIG. 6, FIG. 6 shows a flowchart of an example method 6000 for determining a set of conversation primitive identifiers using a set of sending user identifier proximities which may be used to perform operation 3200. At 6100, the server 106 is configured to identify message sending users associated with each of the multiple communication messages After the server 106 identifies message sending users associated with each of the multiple communication messages, the server 106 is configured to, at 6200, calculate a set of sending user identifier proximities between the multiple communication messages using the identified message sending users.

A sending user identifier proximity is a proximity measure determined based on how closely related the sending users of two or more communication messages in the same group-based communication channel are. The sending user identifier proximity may be calculated by adding, or otherwise calculated according to a pre-defined or learning model provided formula, a set of sending user proximity intermediary values generated based on various metadata associated the user profile. For example, if there are three common workspaces shared between the sending users for two messages, sending user proximity intermediary values for common workspaces would be equal to 30. If there are seven common channels shared between the sending users, sending user proximity intermediary values for common channels would be equal to 14. As a result, in some embodiments, the sending user identifier proximity for the sending users for the two messages would be 30+14=44.

In some embodiments sending user proximity intermediary values may also be determined based on historical conversation segments associated with the send users. For example, if the sending users for two messages shares ten historical conversation segments. The sending user proximity intermediary values for historical conversations would be determined to be 20. Therefore, the sending user identifier proximity for the sending users for the two messages would be 30+14+20=64. The sending user proximity intermediary values for common workspaces, common channels, and historical conversation segments may be determined based on their respective pre-defined formula.

In some embodiments, user interest indicators may be utilized to determine sending user proximity. User interest indicators are one or more items of data that indicate user-associated trends or user behavior, or which may be modeled by a group-based communication system to predict or suggest future user behavior within a group-based communication interface. User interest indicators include all signals of engagement by a user with a group-based communication interface including, without limitation, message communications and message communication information, user profile associated information, direct messages and direct message information, client device reported location data, mouse-over data, click data, channel engagement data, and the like. Such interest indicators could include a popular discussion topics indicator that indicates popular discussion topics in a user's message communications or direct messages, a user's group-based communication channel access counts, group-based communication channel member discussion frequency indicator that indicates the frequency by which the user interacts with the members of a group-based communication channel, a popular direct message recipients indicator that indicates users that the user most frequently sends a direct message to, a user status value (e.g., a user's role or status within an organization), a user's preferred contacts indicator that indicates preferred users (i.e., wife, kids, parents related to the user or other individuals that the user has indicated as preferred), and a user application interaction indicator that indicates a user's interaction with applications installed in one or more group-based communication channels. User interest indicators may also be determined from aggregated data of other users, perhaps deemed similar to a user of interest (e.g., similar role within a group or enterprise, similar age, gender, etc.), stored to the group-based communication repository. In some embodiments, the server 106 may calculate the set of sending user identifier proximities based on these user interest indicators.

After the server 106 calculates a set of sending user identifier proximities between the multiple communication messages using the identified message sending users, the server 106 is configured to, at 6300, compare the set of sending user identifier proximities to a pre-determined sending user identifier threshold.

After the server 106 calculates a set of sending user identifier proximities between the multiple communication messages using the identified message sending users, the server 106 is configured to, at 6400, in a circumstance where a selected set of the sending user identifier proximities satisfy a pre-determined sending user identifier threshold, issue a common primitive identifier to each communication message that is associated with the selected set of sending user identifier proximities. Communication messages with sending user identifier proximities exceeding a pre-defined sending user identifier threshold are determined to have the same conversation primitive identifier. For example, communication messages with message send order proximity above 2 may be determined to have the same conversation primitive identifier. The pre-defined threshold may be provided by message send order proximity learning model.

Determining Conversation Primitive Identifiers Based on Multiple Proximities

Referring now to FIG. 7, FIG. 7 shows a flowchart of an example method 7000 for determining a set of conversation primitive identifiers using multiple proximities which may be used to perform operation 3200.

At 7100, the server 106 is configured to calculate a set of message send time proximities between the multiple communication messages. The method for calculating the set of message send time proximities between the multiple communication messages is described in conjunction with FIG. 4. At 7200, the server 106 is configured to calculate a set of message send order proximities between the multiple communication messages. The method for calculating the set of message send order proximities between the multiple communication messages is described in conjunction with FIG. 5. At 7300, the server 106 is configured to calculate a set of sending user proximities between the multiple communication messages. The method for calculating the set of sending user proximities between the multiple communication messages is described in conjunction with FIG. 6. The order of 7100, 7200, and 7300 may be exchangeable.

After the server 106 calculates the set of message send time proximities, the set of message send order proximities, and the set of sending user proximities, the server 106 is configured to, at 7400, calculate a set of overall message proximities using the set of message send time proximities, the set of message send order proximities, and the set of message sending user proximities. In some embodiments, the overall message proximities may be calculated based on a pre-defined formula. In some embodiments, the pre-defined formula may be generated by a learning model.

After the server 106 calculates the set of overall message proximities, the server 106 is configured to, at 7500, compare the set of overall message proximities to a pre-determined overall message threshold.

After the server 106 compares the set of overall message proximities to a pre-determined overall message threshold, the server 106 is configured to, at 7600, in a circumstance where a selected set of the overall message proximities satisfy a pre-determined overall message threshold, issue a common primitive identifier to each communication message that is associated with the selected set of overall message proximities.

Communication messages with overall message proximity exceeding a pre-defined threshold are determined to have the same conversation primitive identifier. The pre-defined threshold may be provided by an overall message proximity threshold construction learning model.

Determining Conversation Primitive Identifiers Based on Topics

Referring now to FIG. 8, FIG. 8 shows a flowchart of an example method 8000 for determining a set of conversation primitive identifiers based on topics which may be used to perform operation 3200.

At 8100, the server 106 is configured to parse each of the multiple communication messages into one or more communication message segments. Communication message segment is a parsed fraction of a communication message. A communication message may be parsed for various purposes, such as determining topics discussed in the communication message. For example, hashtags in the message may indicate topics associated with the message. In another example, the message may be parsed using a machine learning technique, such as topic modeling, to determine topics associated with the message.

After parsing each of the multiple communication messages into one or more communication message segments, the server 106 is configured to, at 8200, identify a set of topics associated with each of the multiple communication messages. In one implementation, the message contents may be parsed to identify topics discussed in the message. For example, hashtags in the message may indicate topics associated with the message. In another example, the message may be analyzed (e.g., by itself, with other messages in a conversation primitive identifier) or parsed using a machine learning technique, such as topic modeling, to determine topics associated with the message.

After identifying the set of topics associated with each of the multiple communication messages, the server 106 is configured to, at 8300, determine a set of conversation primitive identifiers to each of the multiple communication messages. Communication messages with the same topic are determined to have the same conversation primitive identifier. In some embodiments, a set of keywords may be associated with one particular topic. For example, a topic named "webpage development" may include multiple keywords such as "frontend development", "backend development", "information security", and "user interface design". One keyword may be associated with multiple different topics. For example, keyword "information security" may be associated with the topic named "webpage development" and a topic named "computer systems". Indications of topic-keyword association in the form of probability distributions may also be provided.

User Suggested Conversation Topic

Referring now to FIG. 9, FIG. 9 shows a flowchart of an example method 9000 for re-determining a set of conversation primitive identifiers based on user generated suggestions. The user generated suggestions may be utilized as training data for the conversation segmenting learning model.

At 9100, the server 106 is configured to provide each of the multiple communication messages to a user message categorization interface. At optional operation 9200, the server 106 is configured to provide a set of topics associated with each of the multiple communication messages. The set of topics may be generated using method 8000. At 9300, the server 106 is configured to receive a set of user-generated suggestions of topics associated with the communication messages. If operation 9200 was performed and the set of topics associated with each of the multiple communication messages was provided to the user (for example, via sending the communication messages to a client device associated with the user), the server 106 may also be configured to receive a set of user-generated suggestions associated with the set of topics.

For example, thirty messages along with a set of topics associated with the messages determined by the server 106 may be provided to the user message categorization interface. Users who have access to the user message categorization interface may be able to provide suggestions on the topics. The suggestions may include new topics provided by the users, a correctness indication of the topics determined by the server 106, and/or a topic redetermination indication indicating that additional topic need to be determined.

In some embodiments, the user message categorization interface may be associated with a set of user profiles defined to have access rights to each of the multiple communication messages and viewable by the users who have user profiles defined to have access rights. In some embodiments, the communication messages may be redacted and provided to other users who do not have access rights to each of the multiple communication messages. The user generated suggestions may be fed in to each of the learning models previously mentioned as training data.

At 9400, the server 106 is configured to re-determine a set of conversation primitive identifiers for each of the multiple communication messages based on the user-generated suggestions. Example ways of re-determine include copying user-generated suggestions on topic, updating a topic determination model then re-determine the topic, or the like.

Generating Conversation Primitive Identifiers Using Learning Model

Referring now to FIG. 10, FIG. 10 shows a flowchart of an example method 10000 for generating a conversation primitive identification output comprising one or more conversation primitive identifiers using the conversation primitive identification engine 206.

At operation 10100, the conversation primitive identification engine 206 is configured to access a group-based communication message corpus representing multiple communication messages.

In some embodiments, group-based communication message corpus are constructed by combining multiple channel message corpuses. In some embodiments, a channel message corpus is constructed by periodically collecting group-based communication messages based on time stamp data. In some embodiments, a channel message corpus is constructed by collecting group-based communication messages after a defined number of messages with identical group-based communication channel identifier or thread identifier is received. In some embodiments, a channel message corpus is constructed by collecting group-based communication messages after receiving a request (such as a user request) to construct a channel message corpus. In some embodiments, a channel message corpus is constructed by collecting group-based communication messages in a thread communication that initiated in a channel. In some embodiments, a channel message corpus is constructed in accordance with other construction criteria defined by a message corpus construction learning model.

At operation 10200, the conversation primitive identification engine 206 is configured to parse, using a thread identification module, the group-based communication message corpus to generate one or more thread message corpuses. The thread identification module may parse the group-based communication message corpus to identify thread identifiers associated with the messages in the group-based communication message corpus. Then the thread identification module may Each thread message corpus is a collection of communication messages in a thread communication. The thread communication may be initiated in a group-based communication channel. In some embodiments, thread message corpus are constructed based on a pre-defined trigger. In some embodiments, a thread message corpus is constructed by periodically collecting group-based communication messages based on time stamp data and thread identifier. In some embodiments, a thread message corpus is constructed by collecting group-based communication messages after a defined number of messages with identical thread identifier is received. In some embodiments, a thread message corpus is constructed by collecting group-based communication messages after receiving a request (such as a user request) to construct a thread message corpus. In some embodiments, a thread message corpus is constructed in accordance with other construction criteria defined by a message corpus construction learning model.

At operation 10300, the conversation primitive identification engine 206 is configured to receive a conversation segmenting learning model. The conversation segmenting learning model may be a supervised or unsupervised learning model configured to group one or more communication messages into one or more conversation segments. For example, the conversation segmenting learning model may be a natural language processing learning model such as a neural network based learning model with word embedding techniques. In some embodiments, the conversation segmenting learning model was derived using the thread message corpuses.

At operation 10400, the conversation primitive identification engine 206 is configured to receive a project group-based communication message stream. The project group-based communication message stream is a collection of uncategorized communication messages. The project group-based communication message stream may be a group-based communication message corpus, a channel message corpus, or a thread message corpus. The project group-based communication message stream may be provided by a group-based communication user or a group-based communication system administrator.

At operation 10500, the conversation primitive identification engine 206 is configured to generate a conversation primitive identification output based on the conversation segmenting learning model applied to the project group-based communication message stream. The conversation primitive identification output is configured to provide a conversation categorization of the group-based communication message stream. The conversation primitive identification output is a collection of conversation primitive identifiers generated by a conversation primitive identification engine. The conversation primitive identification output may include one or more conversation primitive identifiers associated with one or more group-based messages.

Determining User's Association with Other Users Using Conversation Segments

FIG. 11 shows a flowchart of an example method 11000, which is an overview for determining user to user link score using one or more conversation segments performed by the server 106.

At 11100, the server 106 is configured to receive a conversation segment. The conversation segment comprises one or more sending user identifiers of one or more group-based communication messages in the conversation segment. In some embodiments, the conversation segment may comprise a conversation primitive associated with the conversation segment. In some embodiments, the conversation segment may comprise a topic associated with the conversation segment.

At 11200, the server 106 is configured to identify sending user identifiers of each group-based communication message of the conversation segment. One or more of the group-based communication messages may have identical sending user identifiers. For example, one or more group-based communication messages in the same conversation segment may have identical sending user identifiers because the one or more group-based communication messages may be sent from the same client device.

At 11300, the server 106 is configured to determine one or more user identifiers of the sending user identifiers that satisfy conversation participation criteria. In some embodiments, the conversation participation criteria are one or more thresholds of number or percentage of group-based communication messages associated with one particular user identifier per conversation segment and optionally relevancy weighting associated with the one or more thresholds. For example, if a conversation segment comprises 200 group-based communication messages, the conversation participation criteria may define that a sending user identifier associated with a minimum of 10, or 5% of total group-based communication messages in the conversation segment, is determined to satisfy the conversation participation criteria (and/or determined to have a weighting of 1). A sending user identifier associated with a minimum of 40, or 20% of total group-based communication messages in the conversation segment, is determined to have a weighting of 2.

In some embodiments, determine one or more user identifiers of the sending user identifiers that satisfy conversation participation criteria includes: for each user identifier, determine a number of group-based communication messages associated with the user identifier in the conversation segment; determine a total number of group-based communication messages in the conversation segment; calculate the percentage of group-based communication messages per conversation segment for the user identifier by dividing the number of group-based communication messages associated with the user identifier in the conversation segment by the total number of group-based communication messages in the conversation segment; compare the percentage of group-based communication messages per conversation segment for the user identifier with the threshold of percentage; if the percentage of group-based communication messages per conversation segment for the user identifier is higher than the threshold of percentage, the conversation participation criteria is satisfied and if the percentage of group-based communication messages per conversation segment for the user identifier is not higher than the threshold of percentage, the conversation participation criteria is not satisfied. In some embodiments, if there is more than one threshold in the conversation participation criteria, the user identifier is determined to satisfy the conversation participation criteria if the percentage is higher than the lowest threshold.

At 11400, the server 106 is configured to update user to user link score associated with each user identifier pair of the one or more user identifiers according to conversation segment-based user to user link score update criteria. Conversation segment-based user to user link score update criteria are a set of rules defining updating of user to user link score based on conversation segments, such as based on conversation participation criteria. For example, conversation segment-based user to user link score update criteria may define that for all user identifiers that satisfied the minimum threshold defined in conversation participation criteria, the user to user link score associated with each user identifier pair of the user identifiers may be incremented by a pre-defined amount. The conversation segment-based user to user link score update criteria may further define that the pre-defined amount is correlated with relevancy weighting as determined by the conversation participation criteria associated with each user identifier in the user identifier pair. In some embodiments, the conversation participation criteria may be stored in the group-based communication repository 107 and received by the server 106. In some embodiments, the server 106 is configured to update one or more user work graphs associated with each user identifier of each of the user identifier pairs. In some embodiments, the update of the user to user link score may be done by first updating the one or more user work graphs. In some embodiments, a separate user to user link score may be updated (which may take the form of being created) and associated with the topic in the conversation segment.

Determining User's Association Content Using
Conversation Segments

FIG. 12 shows a flowchart of an example method 12000, which is an overview for determining user to content affinity score using one or more conversation segments performed by the server 106.

At 12100, the server 106 is configured to receive a conversation segment. The conversation segment comprises one or more sending user identifiers of one or more group-based communication messages in the one or more conversation segment. In some embodiments, the conversation segments may comprise a conversation primitive associated with the conversation segment. In some embodiments, the conversation segment may comprise a topic associated with the conversation segment.

At 12200, the server 106 is configured to identify sending user identifiers of each group-based communication message of the conversation segment. The group-based communication messages may have identical sending user identifiers. For example, one or more group-based communication messages in the same conversation segment may have identical sending user identifiers because the one or more group-based communication messages may be sent from the same client device.

At 12300, the server 106 is configured to determine one or more user identifiers of the sending user identifiers that satisfy conversation participation criteria. The conversation participation criteria are one or more thresholds of number or percentage of group-based communication messages associated with one particular user identifier per conversation segment and optionally relevancy weighting associated with the one or more thresholds. For example, if a conversation segment comprises 200 group-based communication messages, the conversation participation criteria may define that a sending user identifier associated with a minimum of 10, or 5% of total group-based communication messages in the conversation segment, is determined to satisfy the conversation participation criteria (and/or determined to have a weighting of 1). A sending user identifier associated with a minimum of 40, or 20% of total group-based communication messages in the conversation segment, is determined to have a weighting of 2.

In some embodiments, determine one or more user identifiers of the sending user identifiers that satisfy conversation participation criteria includes: for each user identifier, determine a number of group-based communication messages associated with the user identifier in the conversation segment; determine a total number of group-based communication messages in the conversation segment; calculate the percentage of group-based communication messages per conversation segment for the user identifier by dividing the number of group-based communication messages associated with the user identifier in the conversation segment by the total number of group-based communication messages in the conversation segment; compare the percentage of group-based communication messages per conversation segment for the user identifier with the threshold of percentage; if the percentage of group-based communication messages per conversation segment for the user identifier is higher than the threshold of percentage, the conversation participation criteria is satisfied and if the percentage of group-based communication messages per conversation segment for the user identifier is not higher than the threshold of percentage, the conversation participation criteria is not satisfied. In some embodiments, if there is more than one threshold in the conversation participation criteria, the user identifier is determined to satisfy the conversation participation criteria if the percentage is higher than the lowest threshold.

At 12400, the server 106 is configured to update user to content affinity score associated with each user identifier of the one or more user identifiers according to conversation segment-based user to content affinity score update criteria. Conversation segment-based user to content affinity score update criteria are a set of rules defining updating of user to content affinity score based on conversation segments, such as based on conversation participation criteria. For example, conversation segment-based user to content affinity score update criteria may define that for all user identifiers that satisfied the minimum threshold defined in conversation participation criteria, the user to content affinity score associated with each user identifier of the user identifiers and a topic associated with the conversation segment may be incremented by a pre-defined amount. The conversation segment-based user to content affinity score update criteria may further define that the pre-defined amount is correlated with relevancy weighting as determined by the conversation participation criteria associated with each of the user identifiers. In some embodiments, the server 106 is configured to update one or more topic graphs associated with each of the user identifiers. In some embodiments, the update of the user to content affinity score may be done by first updating the one or more topic work graphs.

Example Interface

In FIG. 13, an exemplary interface comprises Channels that are identified as "Trending this week across all departments" in an organization identified as "ACME Corp." For each channel identified, one or more graphical elements representing one or more conversation segments 502A/B, 504A/B, and 506A/B may be rendered. In some embodiments, a first message of each of the conversation segments may also be rendered. The present application incorporates U.S. Application Ser. No. 62/712,013, titled "METHOD, APPARATUS, AND COMPUTER PROGRAM PRODUCT FOR INDIVIDUAL PROFILE TELEMETRY DISCOVERY WITHIN A GROUP BASED COMMUNICATION SYSTEM," filed Jul. 30, 2018, by reference in their entirety. One or more conversation segments and one or more group-based communication messages in the one or more conversation segments may be identified and used as input data for organizational telemetry discovery circuitry disclosed therein.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for updating a graph-based knowledge representation data structure using one or more conversation segments, the apparatus comprising at least one processor and at least one non-transitory memory including program code, the at least one non-transitory memory and the program code configured to, with the processor, cause the apparatus to at least:

receive a conversation segment, wherein the conversation segment comprises one or more group-based communication messages and one or more sending user identifiers of the one or more group-based communication messages;

identify the one or more sending user identifiers of each group-based communication message of the conversation segment;

determine one or more user identifiers of the one or more sending user identifiers that satisfy conversation participation criteria; and update the graph-based knowledge representation data structure, wherein updating the graph-based knowledge representation data structure comprises:

updating one or more user to user link scores associated with corresponding user identifier pairs of the one or more user identifiers based at least in part on one or more conversation topics of the conversation segment.

2. The apparatus of claim 1, wherein the conversation participation criteria comprise one or more thresholds of percentage of group-based communication messages per conversation segment, and wherein determining the one or more user identifiers of the one or more sending user identifiers that satisfy the conversation participation criteria comprises:

for each user identifier:

determine a number of group-based communication messages associated with the user identifier in the conversation segment;

determine a total number of group-based communication messages in the conversation segment;

calculate the percentage of group-based communication messages per conversation segment for the user identifier by dividing the number of group-based communication messages associated with the user identifier in the conversation segment by the total number of group-based communication messages in the conversation segment; and determine that the percentage of group-based communication messages per conversation segment for the user identifier is higher than a lowest threshold of the one or more thresholds of percentage.

3. The apparatus of claim 1, wherein the graph-based knowledge representation data structure is further associated with each user identifier of corresponding user identifier pairs and with a group-based communication channel.

4. The apparatus of claim 1, wherein updating the one or more user to user link scores comprises incrementing an individual user to user link score of the one or more user to user link scores based at least in part on a pre-defined amount defined in the user link score update criteria.

5. The apparatus of claim 4, wherein the pre-defined amount is associated with one or more relevancy weightings defined in the conversation participation criteria.

6. A method for updating user to a graph-based knowledge representation data structure using one or more conversation segments, the method comprising:

receiving a conversation segment, wherein the conversation segment comprises one or more group-based communication messages and one or more sending user identifiers of the one or more group-based communication messages;

identifying the one or more sending user identifiers of each group-based communication message of the conversation segment;

determining one or more user identifiers of the one or more sending user identifiers that satisfy conversation participation criteria; and updating the graph-based knowledge representation data structure, wherein updating the graph-based knowledge representation data structure comprises:

updating a user to user link score associated with each user identifier pair of the one or more user identifiers according to conversation segment-based user to user link score update criteria.

7. The method of claim 6, wherein the conversation participation criteria comprise one or more thresholds of percentage of group-based communication messages per conversation segment, and wherein determining the one or more user identifiers of the one or more sending user identifiers that satisfy the conversation participation criteria comprises:

for each user identifier:
determine a number of group-based communication messages associated with the user identifier in the conversation segment;
determine a total number of group-based communication messages in the conversation segment;
calculate the percentage of group-based communication messages per conversation segment for the user identifier by dividing the number of group-based communication messages associated with the user identifier in the conversation segment by the total number of group-based communication messages in the conversation segment; and
determine that the percentage of group-based communication messages per conversation segment for the user identifier is higher than a lowest threshold of the one or more thresholds of percentage.

8. The method of claim 6, wherein the graph-based knowledge representation data structure is associated with each user identifier of each of the user identifier pairs and with a group-based communication channel.

9. The method of claim 6, wherein updating the user to user link score comprises incrementing the user to user link score based at least in part on a pre-defined amount defined in the user link score update criteria.

10. The method of claim 9, wherein the pre-defined amount is associated with one or more relevancy weightings defined in the conversation participation criteria.

11. The method of claim 6, wherein the user to user link score is based at least in part on user to content affinity scores associated with the one or more user identifiers.

12. The method of claim 6, wherein the user to user link score is based at least in part on user to user data including at least one of:

a number of messages read between a particular user identifier pair;
a number of messages reacted to between the particular user identifier pair; or
a number of channels in common for the particular user identifier pair.

13. The method of claim 6, wherein the user to user link score is based at least in part on user to user data including:

a number of emails transmitted between email addresses associated with a particular user identifier pair; and
recency of emails transmitted between the email addresses associated with the particular user identifier pair.

14. A computer program product comprising at least one non-transitory computer-readable storage medium having computer-readable program code portions stored therein, the computer-readable program code portions comprising an executable portion configured to:

receive a conversation segment, wherein the conversation segment comprises one or more group-based communication messages and one or more sending user identifiers of the one or more group-based communication messages;

identify the one or more sending user identifiers of each group-based communication message of the conversation segment;

determine one or more user identifiers of the one or more sending user identifiers that satisfy conversation participation criteria; and update a graph-based knowledge representation data structure, wherein updating the graph-based knowledge representation data structure comprises:

updating a user to user link score associated with each user identifier pair of the one or more user identifiers according to conversation segment-based user to user link score update criteria.

15. The computer program product of claim 14, wherein the conversation participation criteria comprise one or more thresholds of percentage of group-based communication messages per conversation segment, and wherein determining the one or more user identifiers of the one or more sending user identifiers that satisfy the conversation participation criteria comprises:

for each user identifier:
determine a number of group-based communication messages associated with the user identifier in the conversation segment;
determine a total number of group-based communication messages in the conversation segment;
calculate the percentage of group-based communication messages per conversation segment for the user identifier by dividing the number of group-based communication messages associated with the user identifier in the conversation segment by the total number of group-based communication messages in the conversation segment; and
determine that the percentage of group-based communication messages per conversation segment for the user identifier is higher than a lowest threshold of the one or more thresholds of percentage.

16. The computer program product of claim 14, wherein updating the graph-based knowledge representation data structure is associated with each user identifier of each of the user identifier pairs and with a group-based communication channel.

17. The computer program product of claim 14, wherein updating the user to user link score comprises incrementing the user to user link score based at least in part on a pre-defined amount defined in the user link score update criteria.

18. The computer program product of claim 17, wherein the pre-defined amount is associated with one or more relevancy weightings defined in the conversation participation criteria.

19. The computer program product of claim 14, wherein the user to user link score is based at least in part on user to content affinity scores associated with the one or more user identifiers.

20. The computer program product of claim 14, wherein the user to user link score is based at least in part on user to user data including at least one of:
- a number of messages read between a particular user identifier pair;
- a number of messages reacted to between the particular user identifier pair; or
- a number of channels in common for the particular user identifier pair.

* * * * *